United States Patent
Lin et al.

(10) Patent No.: US 9,264,594 B2
(45) Date of Patent: Feb. 16, 2016

(54) MOBILE DEVICE AND OPTICAL IMAGING LENS THEREOF

(71) Applicant: GeniuS Electronic Optical Co., Ltd.

(72) Inventors: Chia-Cheng Lin, Taichung (TW); Kailun Wang, Fujian (CN); Yan Bin Chen, Fujian (CN)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 0 days.

(21) Appl. No.: 14/256,736

(22) Filed: Apr. 18, 2014

(65) Prior Publication Data

US 2015/0103243 A1    Apr. 16, 2015

(30) Foreign Application Priority Data

Oct. 11, 2013    (CN) .......................... 2013 1 0472840

(51) Int. Cl.

| | |
|---|---|
| *G02B 3/02* | (2006.01) |
| *H04N 5/225* | (2006.01) |
| *G02B 9/60* | (2006.01) |
| *G02B 13/18* | (2006.01) |
| *G02B 13/00* | (2006.01) |
| *G03B 17/12* | (2006.01) |

(52) U.S. Cl.
CPC ................ *H04N 5/2254* (2013.01); *G02B 9/60* (2013.01); *G02B 13/0045* (2013.01); *G02B 13/18* (2013.01); *G03B 17/12* (2013.01)

(58) Field of Classification Search
CPC ........................................................ G02B 9/64
USPC ........................................................ 359/713
See application file for complete search history.

(56) References Cited

U.S. PATENT DOCUMENTS

| | | | |
|---|---|---|---|
| 7,911,712 B2 | 3/2011 | Kitahara | |
| 8,345,323 B2 | 1/2013 | Otomo | |
| 2010/0254029 A1 | 10/2010 | Shinohara | |
| 2011/0316969 A1 | 12/2011 | Hsieh | |
| 2012/0162769 A1* | 6/2012 | Suzuki et al. | ............... 359/558 |
| 2012/0194922 A1 | 8/2012 | Tang | |
| 2013/0057967 A1 | 3/2013 | Tang | |
| 2013/0107376 A1 | 5/2013 | Tsai | |
| 2014/0313594 A1* | 10/2014 | Lee | ............... 359/714 |

FOREIGN PATENT DOCUMENTS

| | | |
|---|---|---|
| JP | 20080281760 | 11/2008 |
| JP | 20100008562 | 1/2010 |

(Continued)

OTHER PUBLICATIONS

Official Action from Taiwan Patent Application No. 102138715 dated Oct. 23, 2014.

(Continued)

*Primary Examiner* — James Jones
(74) *Attorney, Agent, or Firm* — Baker & McKenzie LLP

(57) ABSTRACT

Present embodiments provide for a mobile device and an optical imaging lens thereof. The optical imaging lens comprises five lens elements positioned sequentially from an object side to an image side. Through controlling the convex or concave shape of the surfaces and/or the refracting power of the lens elements, the optical imaging lens shows better optical characteristics and the total length of the optical imaging lens is shortened.

17 Claims, 36 Drawing Sheets

(56) References Cited

FOREIGN PATENT DOCUMENTS

| | | |
|---|---|---|
| JP | 20100256608 | 11/2011 |
| TW | 201213844 | 4/2012 |
| TW | 201232021 | 8/2012 |
| TW | 201234037 | 8/2012 |
| TW | 201237455 | 9/2012 |
| TW | 201239444 | 10/2012 |
| TW | 201245758 | 11/2012 |
| TW | 201314251 | 4/2013 |
| TW | M459409 U1 | 8/2013 |
| TW | 201335619 | 9/2013 |
| TW | 201339633 | 10/2013 |

OTHER PUBLICATIONS

Office Action issued on Oct. 20, 2015 in corresponding CN Patent Application No. 201310472840.3.

* cited by examiner

| f(Focus)= 2.11mm, HFOV(Half angular field of view)= 46.98deg., System length= 3.95mm, Fno=2.40 ||||||||
|---|---|---|---|---|---|---|---|
| Surface # | | Radius | Thickness | Refractive index | Abbe number | Material | Focus |
| - | Object | ∞ | 500 | | | | |
| 111 | 1st lens element | 2.261 | 0.457 | 1.535 | 55.712 | plastic | 7.650 |
| 112 | | 4.675 | 0.176 | | | | |
| 100 | Aperture stop | ∞ | 0.044 | | | | |
| 121 | 2nd lens element | -2488.584 | 0.608 | 1.535 | 55.712 | plastic | 2.726 |
| 122 | | -1.463 | 0.175 | | | | |
| 131 | 3rd lens element | -0.496 | 0.220 | 1.638 | 23.256 | plastic | -3.106 |
| 132 | | -0.774 | 0.050 | | | | |
| 141 | 4th lens element | 3.762 | 0.691 | 1.535 | 55.712 | plastic | 1.467 |
| 142 | | -0.932 | 0.060 | | | | |
| 151 | 5th lens element | 1.525 | 0.323 | 1.638 | 23.256 | plastic | -2.012 |
| 152 | | 0.642 | 0.400 | | | | |
| 161 | IR cut filter | ∞ | 0.210 | | | | |
| 162 | | ∞ | 0.538 | | | | |
| 170 | Image plane | ∞ | | | | | |

FIG. 4

| Aspherical parameters | | | | | |
|---|---|---|---|---|---|
| Surface # | 111 | 112 | 121 | 122 | 131 |
| K | -5.481E+00 | -1.779E-01 | 0.000E+00 | 1.325E+00 | -6.701E-01 |
| $a_4$ | 1.323E-01 | 2.100E-01 | -1.927E-01 | -3.299E-01 | 4.570E-01 |
| $a_6$ | 2.045E-02 | -3.684E-01 | -2.677E-01 | -6.026E-01 | 3.179E-01 |
| $a_8$ | -2.883E-02 | -2.917E-01 | 1.344E+00 | 1.000E+00 | 1.599E+00 |
| $a_{10}$ | 1.262E-02 | 1.066E-01 | -1.208E+01 | -1.045E-02 | -3.347E-01 |
| $a_{12}$ | -3.099E-02 | 1.190E-01 | -1.486E+01 | -1.836E+00 | 3.733E-01 |
| $a_{14}$ | -1.382E-02 | 1.988E-01 | -1.495E+01 | -1.654E+00 | |
| $a_{16}$ | -6.729E-02 | 1.579E-01 | | | |
| Surface # | 132 | 141 | 142 | 151 | 152 |
| K | -8.826E-01 | -2.369E+00 | -7.947E+00 | -2.932E+00 | -4.230E+00 |
| $a_4$ | 1.485E-01 | 5.090E-02 | 9.189E-02 | -2.411E-01 | -1.504E-01 |
| $a_6$ | 2.093E-01 | -2.159E-02 | 5.377E-03 | -7.008E-03 | 4.216E-02 |
| $a_8$ | 5.161E-02 | -8.472E-02 | -7.522E-03 | 3.133E-02 | -9.434E-03 |
| $a_{10}$ | -2.474E-01 | 1.219E-01 | -1.091E-02 | -1.562E-03 | 1.255E-03 |
| $a_{12}$ | 3.611E-01 | -7.668E-02 | 8.106E-04 | -2.149E-03 | 1.342E-04 |
| $a_{14}$ | | 1.333E-02 | 2.157E-03 | -1.235E-04 | -1.398E-04 |
| $a_{16}$ | | 1.853E-03 | -5.166E-04 | 1.509E-04 | 2.224E-05 |

FIG. 5

| f(Focus)= 2.36mm, HFOV(Half angular field of view)= 43.08deg., System length= 3.75mm, Fno=2.40 ||||||||
|---|---|---|---|---|---|---|---|
| Surface # | | Radius | Thickness | Refractive index | Abbe number | Material | Focus |
| - | Object | ∞ | 500 | | | | |
| 211 | 1st lens element | 1.503 | 0.438 | 1.535 | 55.712 | plastic | 4.358 |
| 212 | | 3.778 | 0.233 | | | | |
| 200 | Aperture stop | ∞ | 0.163 | | | | |
| 221 | 2nd lens element | 703.505 | 0.325 | 1.535 | 55.712 | plastic | 4.400 |
| 222 | | -2.369 | 0.236 | | | | |
| 231 | 3rd lens element | -0.544 | 0.220 | 1.638 | 23.256 | plastic | -5.008 |
| 232 | | -0.758 | 0.050 | | | | |
| 241 | 4th lens element | 4.205 | 0.769 | 1.535 | 55.712 | plastic | 1.381 |
| 242 | | -0.842 | 0.061 | | | | |
| 251 | 5th lens element | 3.029 | 0.332 | 1.638 | 23.256 | plastic | -1.363 |
| 252 | | 0.651 | 0.460 | | | | |
| 261 | IR cut filter | ∞ | 0.210 | | | | |
| 262 | | ∞ | 0.312 | | | | |
| 270 | Image plane | ∞ | | | | | |

FIG. 8

| Aspherical parameters | | | | | |
|---|---|---|---|---|---|
| Surface # | 211 | 212 | 221 | 222 | 231 |
| K | -3.085E+00 | -5.136E-01 | 0.000E+00 | -2.390E+00 | -6.684E-01 |
| $a_4$ | 1.389E-01 | 1.732E-01 | -2.881E-01 | -2.729E-01 | 4.321E-01 |
| $a_6$ | 1.582E-02 | -2.853E-01 | 9.303E-02 | -4.383E-01 | 2.990E-01 |
| $a_8$ | -3.973E-02 | -9.121E-02 | -1.361E+00 | 1.272E+00 | 1.455E+00 |
| $a_{10}$ | -9.391E-03 | 1.535E-01 | -8.575E-02 | -8.523E-01 | -6.291E-01 |
| $a_{12}$ | -5.577E-02 | -1.126E-01 | -1.561E+01 | -3.436E+00 | -5.272E-01 |
| $a_{14}$ | -2.843E-02 | -2.331E-01 | 5.399E+01 | 6.345E+00 | |
| $a_{16}$ | -5.970E-02 | 3.266E-01 | | | |
| Surface # | 232 | 241 | 242 | 251 | 252 |
| K | -8.624E-01 | -1.552E+00 | -7.678E+00 | -1.943E+00 | -5.923E+00 |
| $a_4$ | 1.441E-01 | 5.147E-02 | 7.184E-02 | -2.476E-01 | -1.460E-01 |
| $a_6$ | 1.492E-01 | -2.135E-02 | 2.631E-03 | -3.456E-03 | 4.166E-02 |
| $a_8$ | 3.223E-02 | -9.124E-02 | -8.104E-03 | 3.245E-02 | -9.882E-03 |
| $a_{10}$ | -2.416E-01 | 1.231E-01 | -9.881E-03 | -1.928E-03 | 1.215E-03 |
| $a_{12}$ | 2.351E-01 | -7.499E-02 | 1.440E-03 | -2.469E-03 | 1.428E-04 |
| $a_{14}$ | | 1.359E-02 | 2.200E-03 | -1.799E-04 | -1.381E-04 |
| $a_{16}$ | | 1.347E-03 | -6.871E-04 | 1.772E-04 | 2.170E-05 |

FIG. 9

| f(Focus)= 2.39mm, HPOV(Half angular field of view)=43.00 deg., System length= 3.47mm, Fno=2.40 ||||||||
|---|---|---|---|---|---|---|---|
| Surface # | | Radius | Thickness | Refractive index | Abbe number | Material | Focus |
| - | Object | ∞ | 500 | | | | |
| 311 | 1st lens element | 1.306 | 0.407 | 1.535 | 55.712 | plastic | 3.854 |
| 312 | | 3.157 | 0.157 | | | | |
| 300 | Aperture stop | ∞ | 0.150 | | | | |
| 321 | 2nd lens element | 204.526 | 0.324 | 1.535 | 55.712 | plastic | 3.847 |
| 322 | | -2.085 | 0.252 | | | | |
| 331 | 3rd lens element | -0.549 | 0.234 | 1.638 | 23.256 | plastic | -7.972 |
| 332 | | -0.717 | 0.050 | | | | |
| 341 | 4th lens element | -50.118 | 0.582 | 1.535 | 55.712 | plastic | 1.623 |
| 342 | | -0.860 | 0.070 | | | | |
| 351 | 5th lens element | 2.782 | 0.305 | 1.638 | 23.256 | plastic | -1.420 |
| 352 | | 0.658 | 0.400 | | | | |
| 361 | IR cut filter | ∞ | 0.210 | | | | |
| 362 | | ∞ | 0.327 | | | | |
| 370 | Image plane | ∞ | | | | | |

FIG. 12

| Aspherical parameters | | | | | |
|---|---|---|---|---|---|
| Surface # | 311 | 312 | 321 | 322 | 331 |
| K | -2.700E+00 | -3.594E-01 | 0.000E+00 | -6.997E+00 | -6.602E-01 |
| $a_4$ | 1.485E-01 | 1.553E-01 | -2.197E-01 | -2.374E-01 | 4.253E-01 |
| $a_6$ | 1.712E-02 | -3.632E-01 | -4.910E-02 | -3.652E-01 | 2.366E-01 |
| $a_8$ | -7.843E-02 | -1.606E-01 | -1.136E+00 | 1.342E+00 | 1.399E+00 |
| $a_{10}$ | -8.052E-02 | 1.683E-01 | 2.055E+00 | -9.139E-01 | -5.375E-01 |
| $a_{12}$ | -1.395E-01 | 3.518E-02 | -1.487E+01 | -3.687E+00 | -2.598E-01 |
| $a_{14}$ | -8.869E-02 | -9.778E-02 | 2.756E+01 | 6.777E+00 | |
| $a_{16}$ | -2.629E-02 | -2.813E-01 | | | |
| Surface # | 332 | 341 | 342 | 351 | 352 |
| K | -8.639E-01 | -2.242E+03 | -7.546E+00 | -8.852E-01 | -5.871E+00 |
| $a_4$ | 1.434E-01 | 6.854E-02 | 6.598E-02 | -2.426E-01 | -1.405E-01 |
| $a_6$ | 1.618E-01 | -2.358E-02 | 2.860E-03 | -1.920E-03 | 4.119E-02 |
| $a_8$ | 6.197E-02 | -9.557E-02 | -7.168E-03 | 3.251E-02 | -9.940E-03 |
| $a_{10}$ | -2.100E-01 | 1.209E-01 | -9.258E-03 | -2.127E-03 | 1.225E-03 |
| $a_{12}$ | 2.516E-01 | -7.507E-02 | 1.487E-03 | -2.594E-03 | 1.506E-04 |
| $a_{14}$ | | 1.441E-02 | 2.008E-03 | -2.319E-04 | -1.356E-04 |
| $a_{16}$ | | 2.258E-03 | -8.611E-04 | 1.605E-04 | 2.231E-05 |

FIG. 13

| | f(Focus)= 2.11mm, HFOV(Half angular field of view)= 46.97deg., System length= 3.97mm, Fno=2.40 |
|---|---|---|---|---|---|---|---|
| Surface # | | Radius | Thickness | Refractive index | Abbe number | Material | Focus |
| - | Object | ∞ | 500 | | | | |
| 411 | 1st lens element | 2.259 | 0.299 | 1.535 | 55.712 | plastic | 6.089 |
| 412 | | 6.979 | 0.138 | | | | |
| 400 | Aperture stop | ∞ | 0.007 | | | | |
| 421 | 2nd lens element | 19.257 | 0.595 | 1.535 | 55.712 | plastic | 1.970 |
| 422 | | -1.107 | 0.191 | | | | |
| 431 | 3rd lens element | -0.483 | 0.506 | 1.638 | 23.256 | plastic | -5.678 |
| 432 | | -0.786 | 0.038 | | | | |
| 441 | 4th lens element | 4.875 | 0.906 | 1.535 | 55.712 | plastic | 1.353 |
| 442 | | -0.798 | 0.047 | | | | |
| 451 | 5th lens element | 4.201 | 0.228 | 1.638 | 23.256 | plastic | -1.223 |
| 452 | | 0.648 | 0.400 | | | | |
| 461 | IR cut filter | ∞ | 0.210 | | | | |
| 462 | | ∞ | 0.401 | | | | |
| 470 | Image plane | ∞ | | | | | |

FIG. 16

| Aspherical parameters | | | | | |
|---|---|---|---|---|---|
| Surface # | 411 | 412 | 421 | 422 | 431 |
| K | -5.307E+00 | 1.613E+01 | 1.192E+03 | 8.629E-01 | -7.445E-01 |
| $a_4$ | 1.284E-01 | 2.410E-01 | -1.195E-01 | -1.471E-01 | 3.656E-01 |
| $a_6$ | 2.449E-02 | -3.002E-01 | -1.694E-02 | -2.729E-01 | 3.740E-01 |
| $a_8$ | -2.007E-02 | -5.566E-02 | -2.463E-01 | 7.112E-01 | 6.185E-01 |
| $a_{10}$ | 2.394E-02 | 3.459E-01 | -4.836E+00 | -5.825E-01 | 4.206E-01 |
| $a_{12}$ | -2.540E-02 | 2.379E-01 | -4.831E+00 | -2.392E-02 | 7.790E-01 |
| $a_{14}$ | -8.189E-04 | 7.873E-01 | -4.825E+00 | -1.332E+00 | |
| $a_{16}$ | -7.184E-02 | -1.380E-01 | | | |
| Surface # | 432 | 441 | 442 | 451 | 452 |
| K | -9.067E-01 | 6.570E+00 | -1.011E+01 | -2.476E+00 | -6.899E+00 |
| $a_4$ | 1.397E-01 | 6.118E-02 | 3.688E-02 | -2.204E-01 | -1.580E-01 |
| $a_6$ | 1.389E-01 | -2.026E-02 | 2.501E-03 | -9.571E-03 | 5.127E-02 |
| $a_8$ | 2.218E-02 | -9.515E-02 | -8.110E-03 | 3.270E-02 | -8.487E-03 |
| $a_{10}$ | -3.066E-01 | 1.187E-01 | -1.151E-02 | -1.886E-03 | 1.147E-03 |
| $a_{12}$ | 3.142E-01 | -7.204E-02 | 6.142E-04 | -2.301E-03 | 1.059E-04 |
| $a_{14}$ | | 1.304E-02 | 2.268E-03 | -1.330E-04 | -1.479E-04 |
| $a_{16}$ | | 1.559E-03 | -5.119E-04 | 1.239E-04 | 2.169E-05 |

FIG. 17

| f(Focus)= 2.21mm, HPOV(Half angular field of view)= 46.36deg., System length= 3.97mm, Fno=2.40 ||||||||
|---|---|---|---|---|---|---|---|
| Surface # | | Radius | Thickness | Refractive index | Abbe number | Material | Focus |
| - | Object | ∞ | | | | | |
| 511 | 1st lens element | 2.095 | 0.346 | 1.535 | 55.712 | plastic | 5.996 |
| 512 | | 5.659 | 0.130 | | | | |
| 500 | Aperture stop | ∞ | 0.005 | | | | |
| 521 | 2nd lens element | 19.281 | 0.652 | 1.535 | 55.712 | plastic | 1.969 |
| 522 | | -1.105 | 0.213 | | | | |
| 531 | 3rd lens element | -0.481 | 0.451 | 1.638 | 23.256 | plastic | -4.647 |
| 532 | | -0.784 | 0.043 | | | | |
| 541 | 4th lens element | 4.766 | 0.915 | 1.535 | 55.712 | plastic | 1.359 |
| 542 | | -0.803 | 0.050 | | | | |
| 551 | 5th lens element | 4.736 | 0.232 | 1.638 | 23.256 | plastic | -1.208 |
| 552 | | 0.654 | 0.400 | | | | |
| 561 | IR cut filter | ∞ | 0.210 | | | | |
| 562 | | ∞ | 0.330 | | | | |
| 570 | Image plane | ∞ | | | | | |

FIG. 20

| Aspherical parameters | | | | | |
|---|---|---|---|---|---|
| Surface # | 511 | 512 | 521 | 522 | 531 |
| K | -5.648E+00 | -1.683E+01 | 8.856E+02 | 7.875E-01 | -7.381E-01 |
| $a_4$ | 1.240E-01 | 2.214E-01 | -5.963E-02 | -1.726E-01 | 3.518E-01 |
| $a_6$ | 1.495E-02 | -3.100E-01 | -1.427E-01 | -1.142E-01 | 3.389E-01 |
| $a_8$ | -3.036E-02 | -7.473E-02 | -3.314E-01 | 6.265E-01 | 5.560E-01 |
| $a_{10}$ | 8.514E-03 | 2.578E-01 | -4.160E+00 | -4.548E-01 | 3.287E-01 |
| $a_{12}$ | -4.674E-02 | -7.447E-02 | -4.100E+00 | -1.094E-01 | 6.249E-01 |
| $a_{14}$ | -2.695E-02 | -1.830E-01 | -4.143E+00 | -1.743E+00 | |
| $a_{16}$ | -1.006E-01 | -2.555E+00 | | | |
| Surface # | 532 | 541 | 542 | 551 | 552 |
| K | -8.897E-01 | 5.515E+00 | -1.366E+01 | 3.786E-01 | -1.018E+01 |
| $a_4$ | 1.340E-01 | 5.888E-02 | 2.913E-02 | -2.179E-01 | -1.574E-01 |
| $a_6$ | 1.331E-01 | -2.226E-02 | 1.045E-02 | -9.353E-03 | 5.142E-02 |
| $a_8$ | 2.503E-02 | -9.555E-02 | -6.432E-03 | 3.277E-02 | -8.563E-03 |
| $a_{10}$ | -3.071E-01 | 1.187E-01 | -1.151E-02 | -1.824E-03 | 1.123E-03 |
| $a_{12}$ | 3.010E-01 | -7.204E-02 | 5.035E-04 | -2.286E-03 | 1.026E-04 |
| $a_{14}$ | | 1.304E-02 | 2.225E-03 | -1.377E-04 | -1.477E-04 |
| $a_{16}$ | | 1.548E-03 | -5.204E-04 | 1.167E-04 | 2.207E-05 |

FIG. 21

| \multicolumn{8}{c|}{f(Focus)= 2.27mm, HFOV(Half angular field of view)= 44.89 deg., System length= 3.99mm, Fno=2.40} |
|---|---|---|---|---|---|---|---|
| Surface # | | Radius | Thickness | Refractive index | Abbe number | Material | Focus |
| - | Object | ∞ | 500 | | | | |
| 611 | 1st lens element | 2.155 | 0.376 | 1.535 | 55.712 | plastic | 8.738 |
| 612 | | 3.745 | 0.246 | | | | |
| 600 | Aperture stop | ∞ | 0.055 | | | | |
| 621 | 2nd lens element | 19.080 | 0.537 | 1.535 | 55.712 | plastic | 2.751 |
| 622 | | -1.585 | 0.201 | | | | |
| 631 | 3rd lens element | -0.535 | 0.220 | 1.638 | 23.256 | plastic | -3.071 |
| 632 | | -0.853 | 0.050 | | | | |
| 641 | 4th lens element | -10.860 | 0.549 | 1.535 | 55.712 | plastic | 1.491 |
| 642 | | -0.759 | 0.079 | | | | |
| 651 | 5th lens element | 1.626 | 0.366 | 1.638 | 23.256 | plastic | -2.080 |
| 652 | | 0.669 | 0.400 | | | | |
| 661 | IR cut filter | ∞ | 0.210 | | | | |
| 662 | | ∞ | 0.696 | | | | |
| 670 | Image plane | ∞ | | | | | |

FIG. 24

| Aspherical parameters | | | | | |
|---|---|---|---|---|---|
| Surface # | 611 | 612 | 621 | 622 | 631 |
| K | -4.716E+00 | 9.893E-01 | 0.000E+00 | -2.586E-01 | -5.317E-01 |
| $a_4$ | 1.338E-01 | 1.777E-01 | -3.197E-01 | -3.234E-01 | 4.872E-01 |
| $a_6$ | 2.722E-02 | -2.593E-01 | 1.104E+00 | -1.091E+00 | 2.297E-01 |
| $a_8$ | -4.223E-02 | -3.080E-01 | -7.587E+00 | 6.118E-01 | 2.753E+00 |
| $a_{10}$ | 6.270E-03 | 2.205E-01 | 6.422E+00 | 2.321E+00 | -8.628E+00 |
| $a_{12}$ | -7.097E-02 | -4.015E-03 | -8.536E+00 | -1.020E+01 | 1.287E+01 |
| $a_{14}$ | -2.812E-02 | -2.779E-01 | -7.001E+00 | 7.479E+00 | |
| $a_{16}$ | -1.902E-02 | 4.539E-01 | | | |
| Surface # | 632 | 641 | 642 | 651 | 652 |
| K | -8.797E-01 | 9.682E+01 | -4.580E+00 | -2.427E+00 | -5.363E+00 |
| $a_4$ | 2.203E-01 | 2.901E-01 | 1.070E-01 | -1.518E-01 | -6.918E-02 |
| $a_6$ | 1.671E-01 | -3.196E-01 | 2.772E-02 | 2.002E-02 | 1.161E-02 |
| $a_8$ | -2.213E-01 | 1.083E-01 | -7.956E-03 | 2.672E-04 | -3.779E-03 |
| $a_{10}$ | -1.341E-01 | 9.583E-02 | -2.694E-02 | -1.149E-03 | 5.816E-04 |
| $a_{12}$ | 2.573E-01 | -9.024E-02 | 2.169E-03 | 1.495E-04 | 1.377E-04 |
| $a_{14}$ | | -2.317E-02 | 3.834E-03 | -2.028E-05 | -9.565E-05 |
| $a_{16}$ | | 2.359E-02 | 2.046E-04 | 4.676E-05 | 1.287E-05 |

FIG. 25

| f(Focus)= 2.21mm, HPOV(Half angular field of view)= 45.5 deg., System length= 3.88mm, Fno=2.40 ||||||||
|---|---|---|---|---|---|---|---|
| Surface # | | Radius | Thickness | Refractive index | Abbe number | Material | Focus |
| - | Object | ∞ | 500 | | | | |
| 711 | 1st lens element | 2.070 | 0.444 | 1.535 | 55.712 | plastic | 5.580 |
| 712 | | 6.197 | 0.261 | | | | |
| 700 | Aperture stop | ∞ | 0.094 | | | | |
| 721 | 2nd lens element | -8.158 | 0.340 | 1.544 | 56.114 | plastic | 3.118 |
| 722 | | -1.429 | 0.213 | | | | |
| 731 | 3rd lens element | -0.569 | 0.278 | 1.650 | 21.667 | plastic | -4.648 |
| 732 | | -0.835 | 0.051 | | | | |
| 741 | 4th lens element | 5.242 | 0.778 | 1.535 | 55.712 | plastic | 1.389 |
| 742 | | -0.824 | 0.059 | | | | |
| 751 | 5th lens element | 2.268 | 0.370 | 1.638 | 23.256 | plastic | -1.554 |
| 752 | | 0.661 | 0.400 | | | | |
| 761 | IR cut filter | ∞ | 0.210 | | | | |
| 762 | | ∞ | 0.476 | | | | |
| 770 | Image plane | ∞ | | | | | |

FIG. 28

| Aspherical parameters | | | | | |
|---|---|---|---|---|---|
| Surface # | 711 | 712 | 721 | 722 | 731 |
| K | -7.686E+00 | -1.738E+02 | 4.920E+01 | 1.766E+00 | -6.827E-01 |
| $a_4$ | 1.258E-01 | 1.750E-01 | -2.550E-01 | -2.402E-01 | 4.405E-01 |
| $a_6$ | 1.196E-02 | -2.724E-01 | -4.834E-01 | -1.940E-01 | 4.461E-01 |
| $a_8$ | -5.505E-02 | -5.375E-02 | -2.002E-01 | 1.412E+00 | 7.175E-01 |
| $a_{10}$ | 3.872E-03 | 2.363E-01 | -2.071E+00 | -1.137E+00 | 5.415E-01 |
| $a_{12}$ | -3.641E-02 | -8.241E-03 | -1.038E-01 | -2.002E-01 | -1.476E+00 |
| $a_{14}$ | 3.294E-02 | -2.773E-01 | 2.001E+00 | -2.085E+00 | |
| $a_{16}$ | -1.917E-02 | 1.627E-01 | | | |
| Surface # | 732 | 741 | 742 | 751 | 752 |
| K | -9.135E-01 | 6.086E+00 | -7.178E+00 | -5.175E-01 | -5.071E+00 |
| $a_4$ | 1.876E-01 | 5.494E-02 | 5.995E-02 | -2.386E-01 | -1.488E-01 |
| $a_6$ | 9.762E-02 | -2.332E-02 | 1.255E-02 | -1.368E-02 | 4.121E-02 |
| $a_8$ | -1.202E-01 | -9.451E-02 | -6.749E-03 | 3.061E-02 | -9.213E-03 |
| $a_{10}$ | -3.685E-01 | 1.208E-01 | -1.082E-02 | -1.805E-03 | 1.234E-03 |
| $a_{12}$ | 6.076E-01 | -7.357E-02 | 6.573E-04 | -2.148E-03 | 1.359E-04 |
| $a_{14}$ | | 1.353E-02 | 2.168E-03 | -9.089E-05 | -1.396E-04 |
| $a_{16}$ | | 1.649E-03 | -5.348E-04 | 1.657E-04 | 2.203E-05 |

FIG. 29

| \multicolumn{7}{c}{f(Focus)= 2.21mm, HFOV(Half angular field of view)= 45.5 deg., System length= 3.87mm, Fno=2.40} | | | | | | |
|---|---|---|---|---|---|---|
| Surface # | | Radius | Thickness | Refractive index | Abbe number | Material | Focus |
| - | Object | ∞ | 500 | | | | |
| 811 | 1st lens element | 2.109 | 0.442 | 1.535 | 55.712 | plastic | 5.676 |
| 812 | | 6.350 | 0.261 | | | | |
| 800 | Aperture stop | ∞ | 0.093 | | | | |
| 821 | 2nd lens element | -7.700 | 0.340 | 1.531 | 49.620 | plastic | 3.257 |
| 822 | | -1.439 | 0.211 | | | | |
| 831 | 3rd lens element | -0.567 | 0.278 | 1.582 | 30.186 | plastic | -4.970 |
| 832 | | -0.832 | 0.051 | | | | |
| 841 | 4th lens element | 5.275 | 0.777 | 1.535 | 55.712 | plastic | 1.302 |
| 842 | | -0.826 | 0.059 | | | | |
| 851 | 5th lens element | 2.262 | 0.269 | 1.638 | 23.256 | plastic | -1.558 |
| 852 | | 0.662 | 0.400 | | | | |
| 861 | IR cut filter | ∞ | 0.210 | | | | |
| 862 | | ∞ | 0.476 | | | | |
| 870 | Image plane | ∞ | | | | | |

FIG. 32

| Aspherical parameters | | | | | |
|---|---|---|---|---|---|
| Surface # | 811 | 812 | 821 | 822 | 831 |
| K | -7.834E+00 | -1.633E+02 | 3.480E+01 | 1.747E+00 | -6.813E-01 |
| $a_4$ | 1.256E-01 | 1.750E-01 | -2.469E-01 | -2.343E-01 | 4.355E-01 |
| $a_6$ | 1.246E-02 | -2.725E-01 | -4.833E-01 | -2.035E-01 | 4.502E-01 |
| $a_8$ | -5.444E-02 | -5.355E-02 | -2.005E-01 | 1.320E+00 | 7.319E-01 |
| $a_{10}$ | 4.138E-03 | 2.364E-01 | -2.399E+00 | -1.394E+00 | 5.572E-01 |
| $a_{12}$ | -3.638E-02 | -8.178E-03 | -3.406E-01 | -2.004E-01 | -1.464E+00 |
| $a_{14}$ | 3.293E-02 | -2.773E-01 | 2.001E+00 | -2.101E+00 | |
| $a_{16}$ | -1.916E-02 | 1.626E-01 | | | |
| Surface # | 832 | 841 | 842 | 851 | 852 |
| K | -9.162E-01 | 6.351E+00 | -7.273E+00 | -5.367E-01 | -5.049E+00 |
| $a_4$ | 1.884E-01 | 5.511E-02 | 5.971E-02 | -2.389E-01 | -1.484E-01 |
| $a_6$ | 9.618E-02 | -2.302E-02 | 1.242E-02 | -1.373E-02 | 4.124E-02 |
| $a_8$ | -1.226E-01 | -9.430E-02 | -6.810E-03 | 3.060E-02 | -9.208E-03 |
| $a_{10}$ | -3.661E-01 | 1.209E-01 | -1.085E-02 | -1.809E-03 | 1.236E-03 |
| $a_{12}$ | 6.274E-01 | -7.351E-02 | 6.483E-04 | -2.149E-03 | 1.365E-04 |
| $a_{14}$ | | 1.355E-02 | 2.167E-03 | -9.077E-05 | -1.394E-04 |
| $a_{16}$ | | 1.653E-03 | -5.232E-04 | 1.657E-04 | 2.209E-05 |

FIG. 33

| f(Focus)= 2.15mm, HFOV(Half angular field of view)= 45.90 deg., System length= 3.75mm, Fno=2.40 ||||||||
|---|---|---|---|---|---|---|---|
| Surface # | | Radius | Thickness | Refractive index | Abbe number | Material | Focus |
| - | Object | ∞ | 500 | | | | |
| 911 | 1st lens element | 1.840 | 0.421 | 1.535 | 55.712 | plastic | 6.468 |
| 912 | | 3.604 | 0.105 | | | | |
| 900 | Aperture stop | ∞ | 0.064 | | | | |
| 921 | 2nd lens element | 17.996 | 0.566 | 1.535 | 55.712 | plastic | 2.519 |
| 922 | | -1.446 | 0.220 | | | | |
| 931 | 3rd lens element | -0.507 | 0.210 | 1.638 | 23.256 | plastic | -3.392 |
| 932 | | -0.767 | 0.050 | | | | |
| 941 | 4th lens element | -4.729 | 0.771 | 1.535 | 55.712 | plastic | 1.360 |
| 942 | | -0.814 | 0.058 | | | | |
| 951 | 5th lens element | 2.305 | 0.337 | 1.638 | 23.256 | plastic | -1.419 |
| 952 | | 0.616 | 0.400 | | | | |
| 961 | IR cut filter | ∞ | 0.210 | | | | |
| 962 | | ∞ | 0.321 | | | | |
| 970 | Image plane | ∞ | | | | | |

FIG. 36

| Aspherical parameters | | | | | |
|---|---|---|---|---|---|
| Surface # | 911 | 912 | 921 | 922 | 931 |
| K | -4.590E+00 | -1.668E-01 | 0.000E+00 | 7.270E-01 | -6.660E-01 |
| $a_4$ | 1.290E-01 | 1.857E-01 | -1.782E-01 | -3.175E-01 | 4.335E-01 |
| $a_6$ | 6.145E-03 | -5.243E-01 | -4.557E-01 | -5.200E-01 | 2.986E-01 |
| $a_8$ | -5.343E-02 | -5.567E-01 | -3.363E+00 | 8.428E-01 | 1.577E+00 |
| $a_{10}$ | -3.194E-02 | -3.049E-01 | 7.458E+00 | -5.514E-01 | -3.867E-01 |
| $a_{12}$ | -9.811E-02 | -4.710E-02 | 4.062E+01 | -1.711E+00 | 1.618E-01 |
| $a_{14}$ | -1.125E-01 | 2.412E+00 | -3.086E+02 | 5.757E-01 | |
| $a_{16}$ | -1.740E-01 | 5.896E+00 | | | |
| Surface # | 932 | 941 | 942 | 951 | 952 |
| K | -8.968E-01 | -6.955E+00 | -7.287E+00 | -2.685E+00 | -5.030E+00 |
| $a_4$ | 1.526E-01 | 4.505E-02 | 8.038E-02 | -2.493E-01 | -1.316E-01 |
| $a_6$ | 2.115E-01 | -1.821E-02 | 8.064E-03 | -5.895E-03 | 4.032E-02 |
| $a_8$ | 5.062E-02 | -9.299E-02 | -6.935E-03 | 3.295E-02 | -9.695E-03 |
| $a_{10}$ | -2.658E-01 | 1.196E-01 | -1.078E-02 | -1.619E-03 | 1.267E-03 |
| $a_{12}$ | 2.708E-01 | -7.761E-02 | 8.173E-04 | -2.378E-03 | 1.375E-04 |
| $a_{14}$ | | 1.246E-02 | 2.117E-03 | -2.162E-04 | -1.392E-04 |
| $a_{16}$ | | 8.625E-04 | -5.766E-04 | 1.118E-04 | 2.203E-05 |

FIG. 37

| | f(Focus)= 2.61mm, HPOV(Half angular field of view)= 40.79deg., System length= 3.95mm, Fno=2.40 |
|---|---|---|---|---|---|---|---|
| Surface # | | Radius | Thickness | Refractive index | Abbe number | Material | Focus |
| - | Object | ∞ | 500 | | | | |
| 1011 | 1st lens element | 2.293 | 0.253 | 1.535 | 55.712 | plastic | 13.354 |
| 1012 | | 3.241 | 0.080 | | | | |
| 1000 | Aperture stop | ∞ | 0.108 | | | | |
| 1021 | 2nd lens element | 2.632 | 0.523 | 1.535 | 55.712 | plastic | 2.310 |
| 1022 | | -2.181 | 0.429 | | | | |
| 1031 | 3rd lens element | -0.518 | 0.220 | 1.638 | 23.256 | plastic | -1.521 |
| 1032 | | -1.285 | 0.050 | | | | |
| 1041 | 4th lens element | 5.636 | 0.391 | 1.535 | 55.712 | plastic | 2.309 |
| 1042 | | -1.550 | 0.060 | | | | |
| 1051 | 5th lens element | 1.660 | 0.761 | 1.638 | 23.256 | plastic | -92.413 |
| 1052 | | 1.326 | 0.400 | | | | |
| 1061 | IR cut filter | ∞ | 0.210 | | | | |
| 1062 | | ∞ | 0.496 | | | | |
| 1070 | Image plane | ∞ | | | | | |

FIG. 40

| Aspherical parameters | | | | | |
|---|---|---|---|---|---|
| Surface # | 1011 | 1012 | 1021 | 1022 | 1031 |
| K | -1.902E+01 | -7.497E+01 | 0.000E+00 | -3.106E+00 | -6.900E-01 |
| $a_4$ | -4.635E-02 | -1.279E-01 | -1.680E-01 | -2.066E-01 | 5.458E-01 |
| $a_6$ | -3.868E-01 | -1.142E+00 | -7.472E-01 | -4.001E-01 | -4.531E-01 |
| $a_8$ | -2.868E-01 | 1.774E+00 | 1.153E+00 | -3.704E-01 | 1.234E+00 |
| $a_{10}$ | 2.854E-01 | -1.988E+00 | -2.107E+00 | 8.703E-02 | 8.388E-01 |
| $a_{12}$ | 1.511E-01 | -5.968E+00 | -8.735E+00 | 7.413E-01 | -1.116E+00 |
| $a_{14}$ | 3.615E-01 | 3.543E-01 | 1.933E+01 | -3.013E-01 | |
| $a_{16}$ | -1.903E+00 | -4.570E+01 | | | |
| Surface # | 1032 | 1041 | 1042 | 1051 | 1052 |
| K | -3.365E-01 | -1.707E+02 | -4.241E+00 | -1.057E+01 | -6.867E+00 |
| $a_4$ | -2.688E-01 | -9.600E-02 | 2.705E-01 | -3.085E-02 | -5.908E-02 |
| $a_6$ | 4.712E-01 | 2.693E-01 | -1.083E-01 | -6.511E-03 | 2.391E-02 |
| $a_8$ | 2.806E-01 | -2.936E-01 | -7.423E-03 | 9.050E-03 | -8.845E-03 |
| $a_{10}$ | -4.649E-01 | 8.155E-02 | -1.169E-02 | -1.752E-03 | 1.380E-03 |
| $a_{12}$ | 1.198E-01 | -1.537E-02 | 1.832E-03 | -5.588E-04 | 2.433E-04 |
| $a_{14}$ | | 1.631E-02 | 4.363E-03 | 2.356E-04 | -1.100E-04 |
| $a_{16}$ | | -1.519E-02 | -7.858E-04 | -2.284E-05 | 9.874E-06 |

FIG. 41

| \multicolumn{7}{|c|}{f(Focus)= 2.29mm, HFOV(Half angular field of view)= 44.58deg., System length= 3.70mm, Fno=2.40} | | | | | | |
|---|---|---|---|---|---|---|---|
| Surface # | | Radius | Thickness | Refractive index | Abbe number | Material | Focus |
| - | Object | ∞ | 500 | | | | |
| 1111 | 1st lens element | 1.984 | 0.289 | 1.535 | 55.712 | plastic | 5.500 |
| 1112 | | 5.740 | 0.049 | | | | |
| 1100 | Aperture stop | ∞ | 0.143 | | | | |
| 1121 | 2nd lens element | -66.080 | 0.526 | 1.535 | 55.712 | plastic | 2.736 |
| 1122 | | -1.441 | 0.270 | | | | |
| 1131 | 3rd lens element | -0.455 | 0.220 | 1.638 | 23.256 | plastic | -1.701 |
| 1132 | | -0.927 | 0.070 | | | | |
| 1141 | 4th lens element | 2.401 | 0.378 | 1.535 | 55.712 | plastic | 1.904 |
| 1142 | | -1.682 | 0.079 | | | | |
| 1151 | 5th lens element | 1.574 | 0.502 | 1.638 | 23.256 | plastic | -8.916 |
| 1152 | | 1.081 | 0.400 | | | | |
| 1161 | IR cut filter | ∞ | 0.210 | | | | |
| 1162 | | ∞ | 0.565 | | | | |
| 1170 | Image plane | ∞ | | | | | |

FIG. 44

| Aspherical parameters | | | | | |
|---|---|---|---|---|---|
| Surface # | 1111 | 1112 | 1121 | 1122 | 1131 |
| K | -8.648E+00 | -2.273E+02 | 0.000E+00 | -7.640E-01 | -6.801E-01 |
| $a_4$ | 5.730E-02 | -8.354E-02 | -3.685E-01 | -3.399E-01 | 8.105E-01 |
| $a_6$ | -2.726E-01 | -6.245E-01 | -1.034E-01 | -7.298E-01 | -6.918E-01 |
| $a_8$ | -1.795E-01 | -6.115E-01 | -2.173E+00 | 6.799E-01 | 1.467E+00 |
| $a_{10}$ | 1.539E-03 | -1.480E+00 | -2.999E+00 | -2.748E+00 | -7.786E-01 |
| $a_{12}$ | -8.470E-01 | 1.628E+00 | -1.269E+00 | 1.066E-01 | 4.001E+00 |
| $a_{14}$ | -4.639E+00 | 2.917E+01 | 3.190E-01 | 5.721E+00 | |
| $a_{16}$ | 6.711E+00 | -4.245E+01 | | | |
| Surface # | 1132 | 1141 | 1142 | 1151 | 1152 |
| K | -6.127E-01 | -7.673E+01 | -1.152E+01 | -3.835E-01 | -4.541E+00 |
| $a_4$ | -1.570E-01 | 5.776E-02 | 2.702E-01 | -1.823E-01 | -8.495E-02 |
| $a_6$ | 4.003E-01 | 8.514E-02 | -8.927E-02 | 3.974E-03 | 2.199E-02 |
| $a_8$ | 1.927E-01 | -1.898E-01 | -2.516E-02 | 1.927E-02 | -5.730E-03 |
| $a_{10}$ | -5.110E-01 | 1.253E-01 | -5.012E-03 | -1.654E-03 | 1.128E-03 |
| $a_{12}$ | 2.140E-01 | -6.891E-02 | 5.008E-03 | -1.769E-03 | 1.835E-04 |
| $a_{14}$ | | 8.596E-03 | 1.986E-03 | -1.215E-04 | -1.393E-04 |
| $a_{16}$ | | 5.838E-03 | -5.793E-04 | 1.304E-04 | 1.644E-05 |

FIG. 45

| Embodiment | 1st Embodiment | 2nd Embodiment | 3rd Embodiment | 4th Embodiment | 5th Embodiment | 6th Embodiment | 7th Embodiment | 8th Embodiment | 9th Embodiment | 10th Embodiment | 11th Embodiment |
|---|---|---|---|---|---|---|---|---|---|---|---|
| T1 | 0.46 | 0.44 | 0.41 | 0.30 | 0.35 | 0.38 | 0.44 | 0.44 | 0.42 | 0.25 | 0.29 |
| T2 | 0.61 | 0.32 | 0.32 | 0.60 | 0.65 | 0.54 | 0.34 | 0.34 | 0.57 | 0.52 | 0.53 |
| T3 | 0.22 | 0.22 | 0.23 | 0.51 | 0.45 | 0.22 | 0.28 | 0.28 | 0.21 | 0.22 | 0.22 |
| T4 | 0.69 | 0.77 | 0.58 | 0.91 | 0.91 | 0.55 | 0.78 | 0.78 | 0.77 | 0.39 | 0.38 |
| G12 | 0.22 | 0.40 | 0.31 | 0.14 | 0.13 | 0.30 | 0.36 | 0.35 | 0.17 | 0.16 | 0.19 |
| G23 | 0.17 | 0.24 | 0.25 | 0.19 | 0.21 | 0.20 | 0.21 | 0.21 | 0.22 | 0.43 | 0.27 |
| V2 | 55.71 | 55.71 | 55.71 | 55.71 | 55.71 | 55.71 | 56.11 | 49.62 | 55.71 | 55.71 | 55.71 |
| V3 | 23.26 | 23.26 | 23.26 | 23.26 | 23.26 | 23.26 | 21.67 | 30.19 | 23.26 | 23.26 | 23.26 |
| EFL | 2.11 | 2.36 | 2.39 | 2.11 | 2.21 | 2.27 | 2.21 | 2.21 | 2.15 | 2.61 | 2.29 |
| BFL | 1.15 | 0.92 | 0.94 | 1.01 | 0.94 | 1.31 | 1.09 | 1.09 | 0.93 | 1.11 | 1.17 |
| TTL | 3.95 | 3.75 | 3.47 | 3.97 | 3.97 | 3.99 | 3.88 | 3.87 | 3.73 | 3.95 | 3.70 |
| T3/G12 | 1.00 | 0.56 | 0.76 | 3.50 | 3.36 | 0.73 | 0.78 | 0.79 | 1.24 | 1.39 | 1.14 |
| EFL/T2 | 3.47 | 7.26 | 7.39 | 3.54 | 3.39 | 4.25 | 6.49 | 6.50 | 3.80 | 4.99 | 4.35 |
| EFL/G12 | 9.62 | 5.97 | 7.78 | 14.59 | 16.46 | 7.57 | 6.22 | 6.28 | 12.76 | 16.49 | 11.91 |
| EFL/T4 | 3.05 | 3.07 | 4.11 | 2.33 | 2.42 | 4.16 | 2.84 | 2.84 | 2.79 | 6.68 | 6.06 |
| BFL/G12 | 5.23 | 2.33 | 3.05 | 6.99 | 7.00 | 4.34 | 3.05 | 3.09 | 5.53 | 6.99 | 6.11 |
| BFL/T1 | 2.51 | 2.10 | 2.31 | 3.39 | 2.72 | 3.47 | 2.44 | 2.46 | 2.21 | 4.37 | 4.06 |
| EFL/T1 | 4.62 | 5.39 | 5.88 | 7.07 | 6.40 | 6.06 | 4.98 | 4.99 | 5.11 | 10.31 | 7.91 |
| BFL/T4 | 1.66 | 1.20 | 1.61 | 1.12 | 1.03 | 2.38 | 1.40 | 1.40 | 1.21 | 2.83 | 3.11 |
| |v2-v3| | 32.46 | 32.46 | 32.46 | 32.46 | 32.46 | 32.46 | 34.45 | 19.43 | 32.46 | 32.46 | 32.46 |
| T4/G23 | 3.96 | 3.25 | 2.31 | 4.75 | 4.29 | 2.72 | 3.65 | 3.69 | 3.51 | 0.91 | 1.40 |

FIG. 46

MOBILE DEVICE AND OPTICAL IMAGING LENS THEREOF

INCORPORATION BY REFERENCE

This application claims priority from P.R.C. Patent Application No. 201310472840.3, filed on Oct. 11, 2013, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having five lens elements and an optical imaging lens thereof.

BACKGROUND

The ever-increasing demand for smaller sized mobile devices, such as cell phones, digital cameras, etc. correspondingly triggered a growing need for a smaller sized photography module, comprising elements such as an optical imaging lens, a module housing unit, and an image sensor, etc., contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

U.S. Patent Publication No. 20110316969, 20100254029, 20130107376 and 20130057967, U.S. Pat. Nos. 8,345,323 and 7,911,712 and Japan Patent Publication No. 2008-281760 all disclosed an optical imaging lens constructed with an optical imaging lens having five lens elements. The length of the optical imaging lens, which, from the object-side surface of the first lens element to the image plane, is greater than 10 mm, in U.S. Patent Publication No. 20110316969, the length of the optical imaging lens even exceeds 14 mm, and they are too long for smaller sized mobile devices. Therefore, there is needed to develop optical imaging lens which is capable to place with five lens elements therein, with a shorter length, while also having good optical characters.

SUMMARY

An object of the present invention is to provide a mobile device and an optical imaging lens thereof. With controlling the convex or concave shape of the surfaces and/or the refracting power of the lens elements, the length of the optical imaging lens is shortened and meanwhile the good optical characters, and system functionality are sustained.

In an exemplary embodiment, an optical imaging lens comprises, sequentially from an object side to an image side along an optical axis, comprises first, second, third, fourth and fifth lens elements, each of the first, second, third, fourth and fifth lens elements having refracting power, an object-side surface facing toward the object side and an image-side surface facing toward the image side, wherein: the second lens element has positive refracting power, and the image-side surface thereof comprises a convex portion in a vicinity of a periphery of the second lens element; the image-side surface of the third lens element comprises a convex portion in a vicinity of the optical axis; the object-side surface of the fourth lens element comprises a concave portion in a vicinity of a periphery of the fourth lens element, and the image-side surface of the fourth lens element is a convex surface; and the fifth lens element is constructed by plastic material, and the optical imaging lens as a whole comprises only the five lens elements having refracting power.

In another exemplary embodiment, other equation(s), such as those relating to the ratio among parameters could be taken into consideration. For example, a central thickness of the third lens element along the optical axis, T3, and an air gap between the first lens element and the second lens element along the optical axis, G12, could be controlled to satisfy the equation as follows:

$$T3/G12 \leq 3.5 \quad \text{Equation (1); or}$$

A central thickness of the second lens element along the optical axis, T2, and an effective focal length of the optical imaging lens, EFL, could be controlled to satisfy the equation as follows:

$$EFL/T2 \leq 7.5 \quad \text{Equation (2); or}$$

G12 and EFL could be controlled to satisfy the equation as follows:

$$EFL/G12 \leq 16.5 \quad \text{Equation (3); or}$$

$$EFL/G12 \leq 13 \quad \text{Equation (3'); or}$$

EFL and a central thickness of the fourth lens element along the optical axis, T4, could be controlled to satisfy the equation as follows:

$$EFL/T4 \leq 7 \quad \text{Equation (4); or}$$

G12 and a back focal length of the optical imaging lens, i.e. the distance from the image-side surface of the fifth lens element to an image plane on the optical axis, BFL, could be controlled to satisfy the equation as follows:

$$BFL/G12 \leq 7 \quad \text{Equation (5); or}$$

$$BFL/G12 \leq 5.5 \quad \text{Equation (5'); or}$$

BFL and a central thickness of the first lens element along the optical axis, T1, could be controlled to satisfy the equation as follows:

$$BFL/T1 \leq 3.7 \quad \text{Equation (6); or}$$

T1 and EFL could be controlled to satisfy the equation as follows:

$$EFL/T1 \leq 7.5 \quad \text{Equation (7); or}$$

T4 and BFL could be controlled to satisfy the equation as follows:

$$BFL/T4 \leq 3.2 \quad \text{Equation (8); or}$$

The abbe number of the second lens element, V2, and the abbe number of the third lens element, V3, could be controlled to satisfy the equation as follows:

$$15 \leq |V2-V3| \leq 40 \quad \text{Equation (9); or}$$

T4 and an air gap between the second lens element and the third lens element along the optical axis, G23, could be controlled to satisfy the equation as follows:

$$1.7 \leq T4/G23 \quad \text{Equation (10).}$$

Aforesaid exemplary embodiments are not limited and could be selectively incorporated in other embodiments described herein.

In some exemplary embodiments, more details about the convex or concave surface structure could be incorporated for one specific lens element or broadly for plural lens elements to enhance the control for the system performance and/or resolution. For example, the fourth lens element may have positive refracting power, the object-side surface of the fourth lens element may comprise a convex portion in a vicinity of the optical axis, the object-side surface of the fifth lens element may comprise a concave portion in a vicinity of a periphery of the fifth lens element, and/or the image-side surface of the fifth lens element may comprise a convex portion in a vicinity of a periphery of the fifth lens element, etc. It is noted that the details listed here could be incorporated in example embodiments if no inconsistency occurs.

In another exemplary embodiment, a mobile device comprising a housing and a photography module positioned in the housing is provided. The photography module comprises any of aforesaid example embodiments of optical imaging lens, a lens barrel, a module housing unit and an image sensor. The lens barrel is for positioning the optical imaging lens, the module housing unit is for positioning the lens barrel, and the image sensor is positioned at the image side of the optical imaging lens.

Through controlling the convex or concave shape of the surfaces and/or the refraction power of the lens element(s), the mobile device and the optical imaging lens thereof in exemplary embodiments achieve good optical characters and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of a first embodiment of an optical imaging lens according to the present disclosure;

FIG. 5 is a table of aspherical data of a first embodiment of the optical imaging lens according to the present disclosure;

FIG. 8 is a table of optical data for each lens element of the optical imaging lens of a second embodiment of the present disclosure;

FIG. 9 is a table of aspherical data of a second embodiment of the optical imaging lens according to the present disclosure;

FIG. 12 is a table of optical data for each lens element of the optical imaging lens of a third embodiment of the present disclosure;

FIG. 13 is a table of aspherical data of a third embodiment of the optical imaging lens according to the present disclosure;

FIG. 16 is a table of optical data for each lens element of the optical imaging lens of a fourth embodiment of the present disclosure;

FIG. 17 is a table of aspherical data of a fourth embodiment of the optical imaging lens according to the present disclosure;

FIG. 20 is a table of optical data for each lens element of the optical imaging lens of a fifth embodiment of the present disclosure;

FIG. 21 is a table of aspherical data of a fifth embodiment of the optical imaging lens according to the present disclosure;

FIG. 24 is a table of optical data for each lens element of the optical imaging lens of a sixth embodiment of the present disclosure;

FIG. 25 is a table of aspherical data of a sixth embodiment of the optical imaging lens according to the present disclosure;

FIG. 28 is a table of optical data for each lens element of the optical imaging lens of a seventh embodiment of the present disclosure;

FIG. 29 is a table of aspherical data of a seventh embodiment of the optical imaging lens according to the present disclosure;

FIG. 32 is a table of optical data for each lens element of the optical imaging lens of an eighth embodiment of the present disclosure;

FIG. 33 is a table of aspherical data of an eighth embodiment of the optical imaging lens according to the present disclosure;

FIG. 36 is a table of optical data for each lens element of the optical imaging lens of a ninth embodiment of the present disclosure;

FIG. 37 is a table of aspherical data of a ninth embodiment of the optical imaging lens according to the present disclosure;

FIG. 40 is a table of optical data for each lens element of the optical imaging lens of a tenth embodiment of the present disclosure;

FIG. 41 is a table of aspherical data of a tenth embodiment of the optical imaging lens according to the present disclosure;

FIG. 44 is a table of optical data for each lens element of the optical imaging lens of an eleventh embodiment of the present disclosure;

FIG. 45 is a table of aspherical data of an eleventh embodiment of the optical imaging lens according to the present disclosure;

FIG. 46 is a table for the values of T1, T2, T3, T4, G12, G23, V2, V3, EFL, BFL, TTL, T3/G12, EFL/T2, EFL/G12, EFL/T4, BFL/G12, BFL/T1, EFL/T1, BFL/T4, |V2-V3| and T4/G23 of all eleven example embodiments;

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
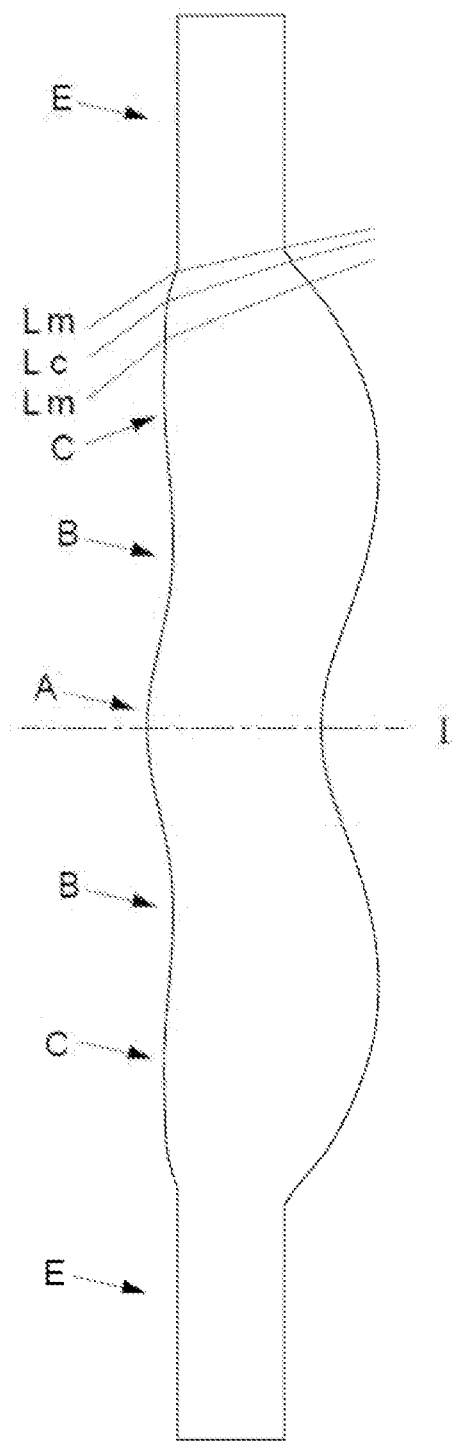
FIG. 1 is a cross-sectional view of one single lens element according to the present disclosure.

Here in the present specification, "a lens element having positive refracting power (or negative refracting power)" means that the lens element has positive refracting power (or negative refracting power) in the vicinity of the optical axis. "An object-side (or image-side) surface of a lens element comprises a convex (or concave) portion in a specific region" means that the object-side (or image-side) surface of the lens element "protrudes outwardly (or depresses inwardly)" along the direction parallel to the optical axis at the specific region, compared with the outer region radially adjacent to the specific region. Taking FIG. 1 for example, the lens element shown therein is radially symmetric around the optical axis which is labeled by I. The object-side surface of the lens element comprises a convex portion at region A, a concave portion at region B, and another convex portion at region C. This is because compared with the outer region radially adjacent to the region A (i.e. region B), the object-side surface protrudes outwardly at the region A, compared with the region C, the object-side surface depresses inwardly at the region B, and compared with the region E, the object-side surface protrudes outwardly at the region C. Here, "in a vicinity of a periphery of a lens element" means that in a vicinity of the peripheral region of a surface for passing imaging light on the lens element, i.e. the region C as shown in FIG. 1. The imaging light comprises chief ray Lc and marginal ray Lm. "In a vicinity of the optical axis" means that in a vicinity of the optical axis of a surface for passing the imaging light on the lens element, i.e. the region A as shown in FIG. 1. Further, a lens element could comprise an extending portion E for mounting the lens element in an optical imaging lens. Ideally, the imaging light would not pass the extending portion E. Here the extending portion E is only for example, the structure and shape thereof are not limited to this specific example. Please also noted that the extending portion of all the lens elements in the example embodiments shown below are skipped for maintaining the drawings clean and concise.

In the present invention, examples of an optical imaging lens which is a prime lens are provided. Example embodiments of an optical imaging lens may comprise a first lens element, a second lens element, a third lens element, a fourth lens element and a fifth lens element, each of the lens elements comprises refracting power, an object-side surface facing toward an object side and an image-side surface facing toward an image side. These lens elements may be arranged sequentially from the object side to the image side along an optical axis, and example embodiments of the lens as a whole may comprise only the five lens elements having refracting power. In an example embodiment: the second lens element has positive refracting power, and the image-side surface thereof comprises a convex portion in a vicinity of a periphery of the second lens element; the image-side surface of the third lens element comprises a convex portion in a vicinity of the optical axis; the object-side surface of the fourth lens element comprises a concave portion in a vicinity of a periphery of the fourth lens element, and the image-side surface of the fourth lens element is a convex surface; and the fifth lens element is constructed by plastic material.

Preferably, the lens elements are designed in light of the optical characteristics and the length of the optical imaging lens. For example, the second lens element having positive refracting power provides the positive refracting power required in the optical imaging lens for assisting in collecting light, and combining this with the convex portion in a vicinity of a periphery of the second lens element formed on the image-side surface thereof, the convex portion in a vicinity of the optical axis formed on the image-side surface of the third lens element, the concave portion in a vicinity of a periphery of the fourth lens element on the object-side surface thereof, the convex image-side surface of the fourth lens element, the aberration of the optical imaging lens could be adjusted. Further with the details of shape on the surfaces and the refracting power of the lens elements listed here, such as the positive refracting power of the fourth lens element, the concave portion in a vicinity of a periphery of the fifth lens element formed on the object-side surface thereof and/or the convex portion in a vicinity of a periphery of the fifth lens element formed on the image-side surface thereof, aberration of the optical imaging lens could be further adjusted. Therefore, through the details listed above, the image quality of the optical imaging lens could be promoted.

In another exemplary embodiment, some equation(s) of parameters, such as those relating to the ratio among parameters could be taken into consideration. For example, a central thickness of the third lens element along the optical axis, T3, and an air gap between the first lens element and the second lens element along the optical axis, G12, could be controlled to satisfy the equation as follows:

$$T3/G12 \leq 3.5 \qquad \text{Equation (1); or}$$

A central thickness of the second lens element along the optical axis, T2, and an effective focal length of the optical imaging lens, EFL, could be controlled to satisfy the equation as follows:

$$EFL/T2 \leq 7.5 \qquad \text{Equation (2); or}$$

G12 and EFL could be controlled to satisfy the equation as follows:

$$EFL/G12 \leq 16.5 \qquad \text{Equation (3); or}$$

$$EFL/G12 \leq 13 \qquad \text{Equation (3'); or}$$

EFL and a central thickness of the fourth lens element along the optical axis, T4, could be controlled to satisfy the equation as follows:

$$EFL/T4 \leq 7 \qquad \text{Equation (4); or}$$

G12 and a back focal length of the optical imaging lens, i.e. the distance from the image-side surface of the fifth lens element to an image plane on the optical axis, BFL, could be controlled to satisfy the equation as follows:

$$BFL/G12 \leq 7 \qquad \text{Equation (5); or}$$

$$BFL/G12 \leq 5.5 \qquad \text{Equation (5'); or}$$

BFL and a central thickness of the first lens element along the optical axis, T1, could be controlled to satisfy the equation as follows:

$$BFL/T1 \leq 3.7 \qquad \text{Equation (6); or}$$

T1 and EFL could be controlled to satisfy the equation as follows:

$$EFL/T1 \leq 7.5 \qquad \text{Equation (7); or}$$

T4 and BFL could be controlled to satisfy the equation as follows:

$$BFL/T4 \leq 3.2 \qquad \text{Equation (8); or}$$

The abbe number of the second lens element, V2, and the abbe number of the third lens element, V3, could be controlled to satisfy the equation as follows:

$$15 \leq |V2-V3| \leq 40 \qquad \text{Equation (9); or}$$

T4 and an air gap between the second lens element and the third lens element along the optical axis, G23, could be controlled to satisfy the equation as follows:

$$1.7 \leq T4/G23 \qquad \text{Equation (10).}$$

Aforesaid exemplary embodiments are not limited and could be selectively incorporated in other embodiments described herein.

Reference is now made to Equation (1). Considering shortening of T3 has more potential than shortening of G12, which is required for a certain distance between the first and second lens element, for the small effective diameter for passing imaging light in the third lens element, here the value of T3/G12 is suggested for an upper limit, such as 3.5 to satisfying Equation (1), and preferably, it is suggested to be within 0.3~3.5.

Reference is now made to Equation (2). Considering the value of EFL is decreased along with the shortening of the length of the optical imaging lens and shortening of T2 is limited by the positive refracting power in the second lens element, here the value of EFL/T2 is suggested for an upper limit, such as 7.5 to satisfying Equation (2), and preferably, it is suggested to be within 3.0~7.5.

Reference is now made to Equation (3). Considering that the shortening of EFL may assist in enlarging the HFOV and the value of G12 is required for a certain distance between the first and second lens element, here EFL/G12 is suggested for an upper limit, such as 16.5 to satisfying Equation (3) or 13.0 to satisfying Equation (3'), and preferably, it is suggested to be limited by a lower limit, such as within 6.0~16.5. When EFL/G12 is lower than or equal to 13.0, the greater G12 may facilitate the assembly process.

Reference is now made to Equations (4). As mentioned before, the shortening of EFL may assist in enlarging the HFOV, but the fourth lens element having a great effective diameter for passing imaging light is required for a thick thickness to facilitate the manufacture process. Therefore, the value of EFL/T4 is suggested for an upper limit, such as 7.0 to satisfy Equation (4), and preferably, it is suggested to be within 1.8~7.0.

Reference is now made to Equation (5). Considering the shortening of BFL has more potential than the shortening of G12, which is required for a certain distance between the first and second lens element, for the short EFL, here the value of BFL/G12 is suggested for an upper limit, such as 7.0 to satisfying Equation (5) or 5.5 to satisfying Equation (5'), and preferably, it is suggested to be limited by a lower limit, such as within 1.8~7.0. When BFL/G12 is lower than or equal to 5.5, the greater G12 may facilitate the assembly process.

Reference is now made to Equation (6). As mentioned before, the shortening of BFL has more potential than the shortening of T1 for the short EFL. Here, the value of BFL/T1 is suggested to be smaller than or equal to 3.7 to satisfy Equation (6), and preferably, it is suggested to be within 1.5~3.7.

Reference is now made to Equation (7). As mentioned above, although both EFL and T1 will be shortened along with the shortening of the length of the optical imaging lens, the shortening of EFL may assist in enlarging the HFOV. Therefore, here the value of EFL/T1 is suggested to be smaller than or equal to 7.5 to satisfy Equation (7), and preferably, it is suggested to be within 4.3~7.5.

Reference is now made to Equation (8). As mentioned before, the shortening of BFL has more potential than the shortening of T4, which is required for a thick thickness to facilitate the manufacture process and the formation of the convex image-side surface of the fourth lens element, for the short EFL. Therefore, here the value of BFL/T4 is suggested for an upper limit, such as 3.2 to satisfying Equation (8), and preferably, it is suggested to be limited by a lower limit, such as within 0.5~3.2.

Reference is now made to Equation (9). Considering that the chromatic aberration may be severe when the length of the optical imaging lens is shortened, here the Equation (9) is designed for eliminating the chromatic aberration by adjusting the abbe number of the second and third lens element.

Reference is now made to Equation (10). Considering that the shortening of the air gap between the second and third lens elements has more potential than the shortening of T4, which is limited by the convex image-side surface and the great effective diameter for passing imaging light of the fourth lens element, for the less possibility of the interference occurred by the convex portion in a vicinity of a periphery of the second lens element formed on the image-side surface thereof, the value of T4/G23 is suggested for a lower limit, such as 1.7 to satisfying Equation (10), and preferably, it is suggested to be within 1.7~5.3.

When implementing example embodiments, more details about the convex or concave surface structure may be incorporated for one specific lens element or broadly for plural lens elements to enhance the control for the system performance and/or resolution, as illustrated in the following embodiments. For example, the fourth lens element may have positive refracting power, the object-side surface of the fourth lens element may comprise a convex portion in a vicinity of the optical axis, the object-side surface of the fifth lens element may comprise a concave portion in a vicinity of a periphery of the fifth lens element, and/or the image-side surface of the fifth lens element may comprise a convex portion in a vicinity of a periphery of the fifth lens element, etc. It is noted that the details listed here could be incorporated in example embodiments if no inconsistency occurs.

Figure 2:
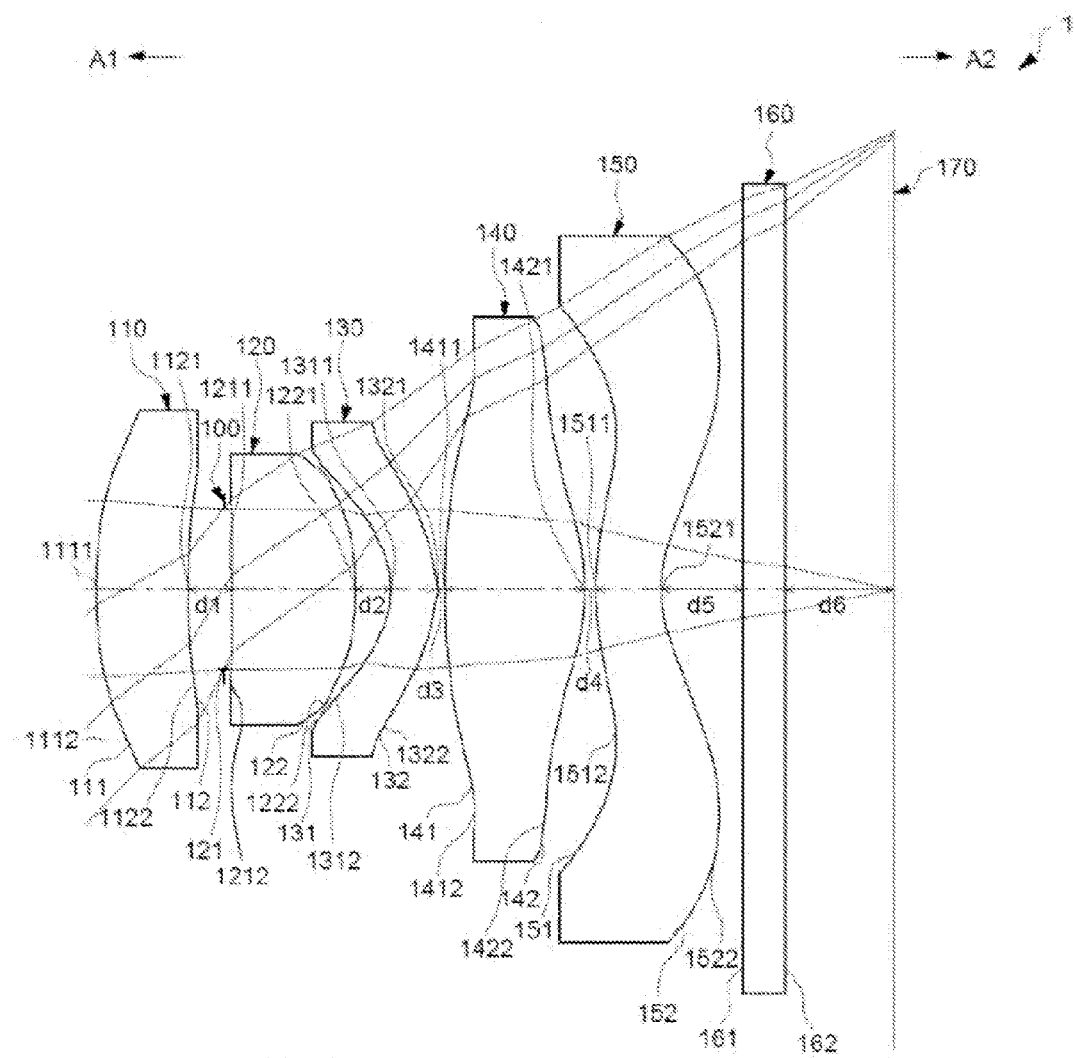
FIG. 2 is a cross-sectional view of a first embodiment of an optical imaging lens having five lens elements according to the present disclosure.
Figure 3:
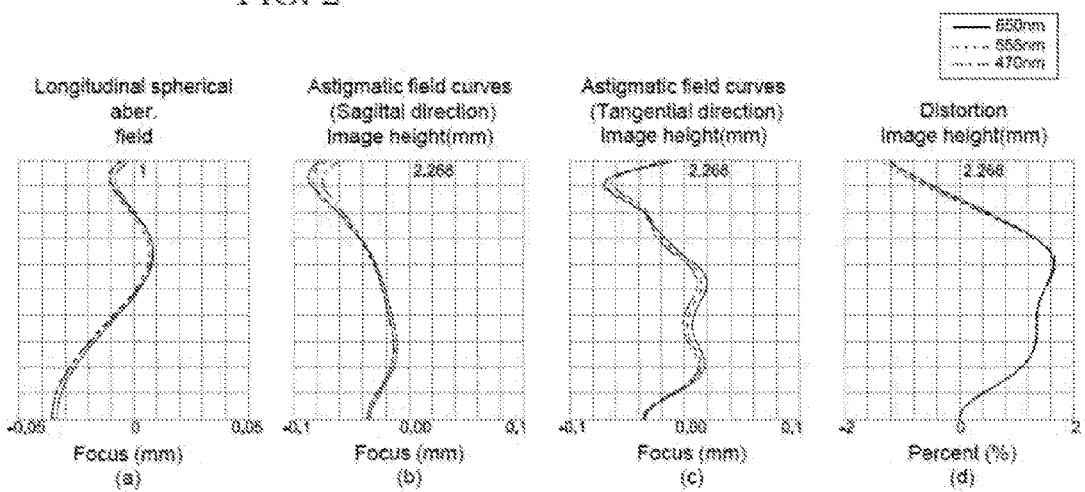
FIG. 3 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characters and a shortened length. Reference is now made to FIGS. 2-5. FIG. 2 illustrates an example cross-sectional view of an optical imaging lens 1 having five lens elements of the optical imaging lens according to a first example embodiment. FIG. 3 shows example charts of longitudinal spherical aberration and other kinds of optical aberrations of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 2, the optical imaging lens 1 of the present embodiment comprises, in order from an object side A1 to an image side A2 along an optical axis, a first lens element 110, an aperture stop 100, a second lens element 120, a third lens element 130, a fourth lens element 140 and a fifth lens element 150. A filtering unit 160 and an image plane 170 of an image sensor are positioned at the image side A2 of the optical lens 1. Each of the first, second, third, fourth, fifth lens elements 110, 120, 130, 140, 150 and the filtering unit 160 comprises an object-side surface 111/121/131/141/151/161 facing toward the object side A1 and an image-side surface 112/122/132/142/152/162 facing toward the image side A2. The example embodiment of the filtering unit 160 illustrated is an IR cut filter (infrared cut filter) positioned between the fifth lens element 150 and an image plane 170. The filtering unit 160 selectively absorbs light with specific wavelength from the light passing optical imaging lens 1. For example, IR light is absorbed, and this will prohibit the IR light which is not seen by human eyes from producing an image on the image plane 170.

Please noted that during the normal operation of the optical imaging lens 1, the distance between any two adjacent lens elements of the first, second, third, fourth and fifth lens elements 110, 120, 130, 140, 150 is a unchanged value, i.e. the optical imaging lens 1 is a prime lens.

Exemplary embodiments of each lens element of the optical imaging lens 1 which may be constructed by plastic material will now be described with reference to the drawings.

An example embodiment of the first lens element 110 has positive refracting power. The object-side surface 111 is a convex surface comprising a convex portion 1111 in a vicinity of the optical axis and a convex portion 1112 in a vicinity of a periphery of the first lens element 110, and the image-side surface 112 is a concave surface comprising a concave portion 1121 in a vicinity of the optical axis and a concave portion 1122 in a vicinity of the periphery of the first lens element 110.

An example embodiment of the second lens element 120 has positive refracting power. The object-side surface 121 is a concave surface comprising a concave portion 1211 in a vicinity of the optical axis and a concave portion 1212 in a vicinity of a periphery of the second lens element 120, and the image-side surface 122 is a convex surface comprising a convex portion 1221 in a vicinity of the optical axis and a convex portion 1222 in a vicinity of the periphery of the second lens element 120.

An example embodiment of the third lens element 130 has negative refracting power. The object-side surface 131 is a concave surface comprising a concave portion 1311 in a vicinity of the optical axis and a concave portion 1312 in a vicinity of a periphery of the third lens element 130, and the image-side surface 132 is a convex surface comprising a convex portion 1321 in a vicinity of the optical axis and a convex portion 1322 in a vicinity of a periphery of the third lens element 130.

An example embodiment of the fourth lens element 140 has positive refracting power. The object-side surface 141 comprises a convex portion 1411 in a vicinity of the optical axis and a concave portion 1412 in a vicinity of a periphery of the fourth lens element 140. The image-side surface 142 is a convex surface comprising a convex portion 1421 in a vicinity of the optical axis and a convex portion 1422 in a vicinity of the periphery of the fourth lens element 140.

An example embodiment of the fifth lens element 150 has negative refracting power. The object-side surface 151 comprises a convex portion 1511 in a vicinity of the optical axis and a concave portion 1512 in a vicinity of a periphery of the fifth lens element 150. The image-side surface 152 comprises a concave portion 1521 in a vicinity of the optical axis and a convex portion 1522 in a vicinity of a periphery of the fifth lens element 150.

In example embodiments, air gaps exist between the lens elements 110, 120, 130, 140, 150, the filtering unit 160 and the image plane 170 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the filtering unit 160 and the air gap d6 existing between the filtering unit 160 and the image plane 170 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, the air gap d4 is denoted by G45.

FIG. 4 depicts the optical characters of each lens elements in the optical imaging lens 1 of the present embodiment, wherein the values of T1, T2, T3, T4, G12, G23, V2, V3, EFL, BFL, TTL, T3/G12, EFL/T2, EFL/G12, EFL/T4, BFL/G12, BFL/T1, EFL/T1, BFL/T4, |V2-V3| and T4/G23 are:

T1=0.46 (mm);
T2=0.61 (mm);
T3=0.22 (mm);
T4=0.69 (mm);
G12=0.22 (mm);
G23=0.17 (mm);
V2=55.71 (mm);
V3=23.26 (mm);
EFL=2.11 (mm);
BFL=1.15 (mm);
TTL=3.95 (mm);
T3/G12=1.00;
EFL/T2=3.47;
EFL/G12=9.62;
EFL/T4=3.05;
BFL/G12=5.23;
BFL/T1=2.51;
EFL/T1=4.62;
BFL/T4=1.66;
|V2-V3|=32.46;
T4/G23=3.96.

The distance from the object-side surface 111 of the first lens element 110 to the image plane 170 along the optical axis is 3.95 mm, and the length of the optical imaging lens 1 is shortened.

Please note that the HFOV of the optical imaging lens 1 reaches 46.98 degrees and meanwhile the length thereof is shortened to only 3.95 mm. Thus, the optical imaging lens 1 is capable to provide excellent imaging quality for smaller sized mobile devices.

The aspherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150 are all defined by the following aspherical formula:

$$Z(Y) = \frac{Y^2}{R} \Bigg/ \left(1 + \sqrt{1-(1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 5.

As illustrated in FIG. 3, longitudinal spherical aberration (a), the curves of different wavelengths are closed to each other. This represents off-axis light with respect to these wavelengths is focused around an image point. From the vertical deviation of each curve shown therein, the offset of the off-axis light relative to the image point is within ±0.04 mm. Therefore, the present embodiment improves the longitudinal spherical aberration with respect to different wavelengths.

Please refer to FIG. 3, astigmatism aberration in the sagittal direction (b) and astigmatism aberration in the tangential direction (c). The focus variation with respect to the three wavelengths in the whole field falls within ±0.10 mm. This reflects the optical imaging lens 1 of the present embodiment eliminates aberration effectively. Additionally, the closed curves represents dispersion is improved.

Please refer to FIG. 3, distortion aberration (d), which showing the variation of the distortion aberration is within ±2%. Such distortion aberration meets the requirement of acceptable image quality and shows the optical imaging lens 1 of the present embodiment could restrict the distortion aberration to raise the image quality even though the length of the optical imaging lens 1 is shortened to 3.95 mm.

Therefore, the optical imaging lens 1 of the present embodiment shows great characteristics in the longitudinal spherical aberration, astigmatism in the sagittal direction, astigmatism in the tangential direction, and distortion aberration. According to above illustration, the optical imaging lens 1 of the example embodiment indeed achieves great optical performance and the length of the optical imaging lens 1 is effectively shortened.

Figure 6:
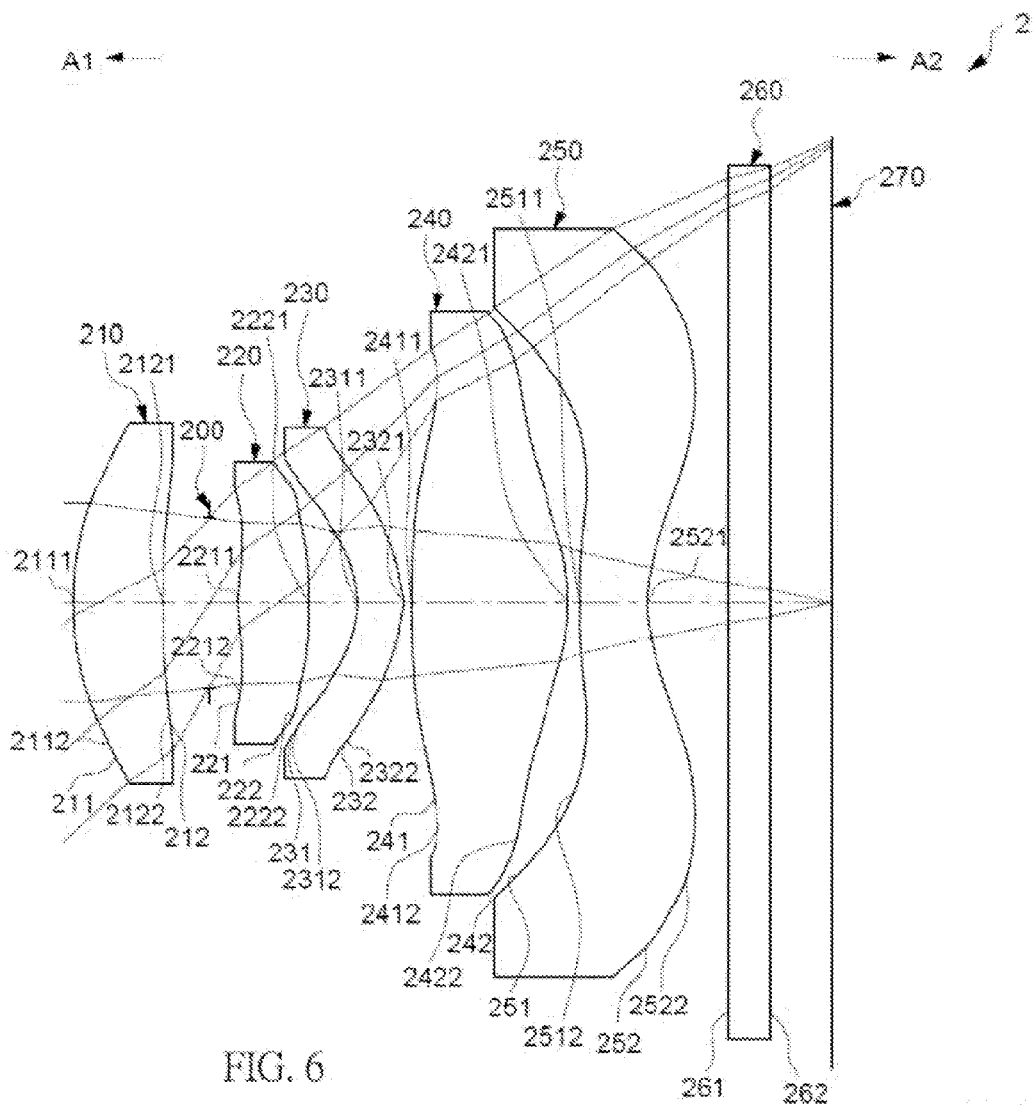
FIG. 6 is a cross-sectional view of a second embodiment of an optical imaging lens having five lens elements according to the present disclosure.
Figure 7:
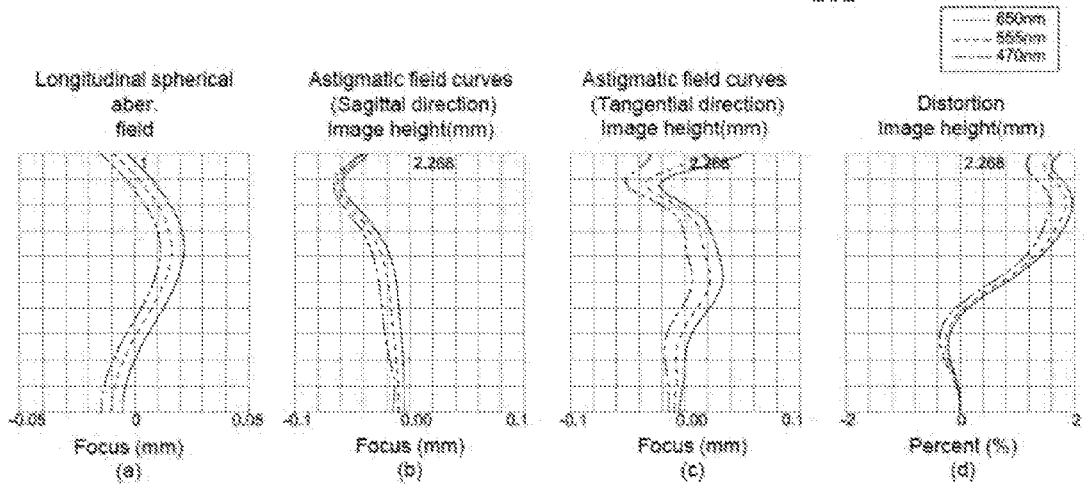
FIG. 7 is a chart of longitudinal spherical aberration and other kinds of optical aberrations of a second embodiment of the optical imaging lens according to the present disclosure.

Reference is now made to FIGS. 6-9. FIG. 6 illustrates an example cross-sectional view of an optical imaging lens 2 having five lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the optical imaging lens 2 of the present embodiment, in an order from an object side A1 to an image side A2 along an optical axis, comprises a first lens element 210, an aperture stop 200, a second lens element 220, a third lens element 230, a fourth lens element 240 and a fifth lens element 250.

The differences between the second embodiment and the first embodiment are the radius of curvature and thickness of each lens element, the distance of each air gap and the configuration of the concave/convex shape of the object-side surface 221, but the configuration of the positive/negative refracting power of the first, second, third, fourth and fifth lens elements 210, 220, 230, 240, 250 and configuration of the concave/convex shape of surfaces, comprising the object-side surfaces 211, 231, 241, 251 facing to the object side A1 and the image-side surfaces 212, 222, 232, 242, 252 facing to the image side A2, are similar to those in the first embodiment. Specifically, the object-side surface 221 of the second lens element 220 comprises a convex portion 2211 in a vicinity of the optical axis and a concave portion 2212 in a vicinity of a periphery of the second lens element 220. Please refer to FIG. 8 for the optical characteristics of each lens elements in the optical imaging lens 2 the present embodiment, the values of T1, T2, T3, T4, G12, G23, V2, V3, EFL, BFL, TTL, T3/G12, EFL/T2, EFL/G12, EFL/T4, BFL/G12, BFL/T1, EFL/T1, BFL/T4, |V2-V3| and T4/G23 are:

T1=0.44 (mm);
T2=0.32 (mm);
T3=0.22 (mm);
T4=0.77 (mm);
G12=0.40 (mm);
G23=0.24 (mm);
V2=55.71 (mm);
V3=23.26 (mm);
EFL=2.36 (mm);
BFL=0.92 (mm);
TTL=3.75 (mm);
T3/G12=0.56;
EFL/T2=7.26;
EFL/G12=5.97;
EFL/T4=3.07;
BFL/G12=2.33;
BFL/T1=2.10;
EFL/T1=5.39;
BFL/T4=1.20;
|V2-V3|=32.46;
T4/G23=3.25.

The distance from the object-side surface 211 of the first lens element 210 to the image plane 270 along the optical axis is 3.75 mm and the length of the optical imaging lens 2 is shortened.

Please note that the HFOV of the optical imaging lens 2 reaches 43.08 degrees and meanwhile the length thereof is shortened to only 3.75 mm. Thus, the optical imaging lens 2 is capable to provide excellent imaging quality for smaller sized mobile devices.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 2 is effectively shortened.

Figure 10:
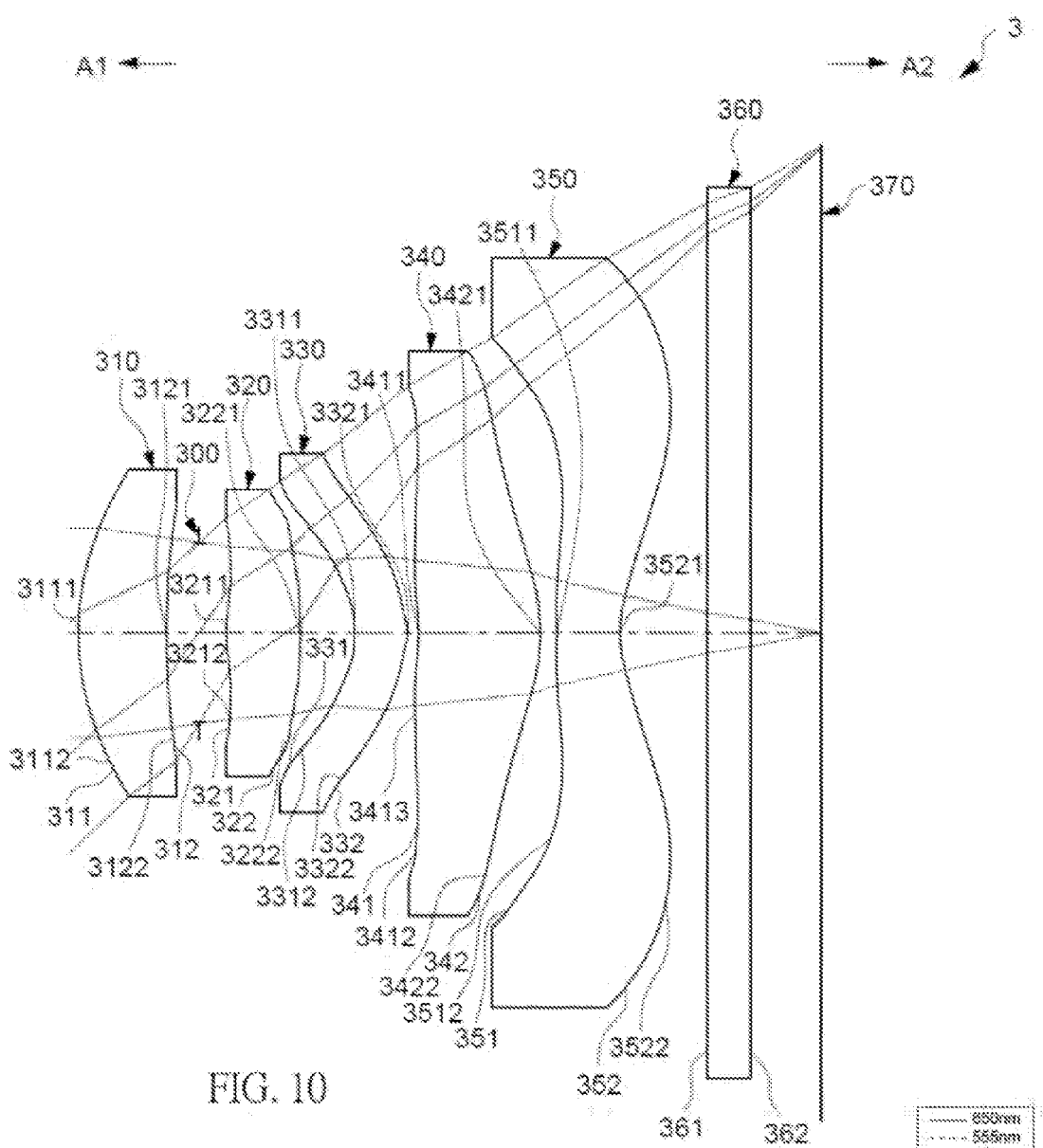
FIG. 10 is a cross-sectional view of a third embodiment of an optical imaging lens having five lens elements according to the present disclosure.
Figure 11:
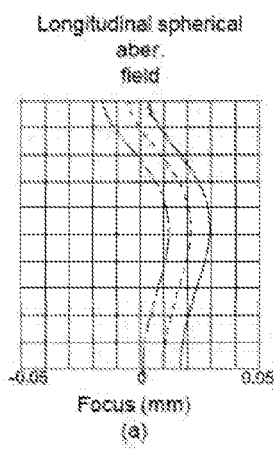
FIG. 11 is a chart of longitudinal spherical aberration and other kinds of optical aberrations of a third embodiment of the optical imaging lens according the present disclosure.
Figure 11:
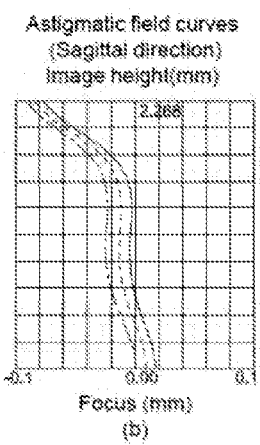
Figure 11:
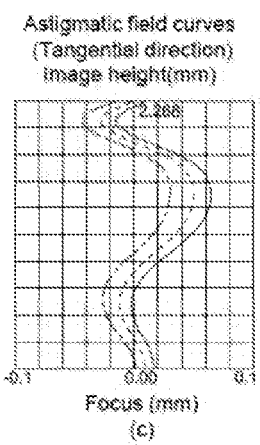
Figure 11:
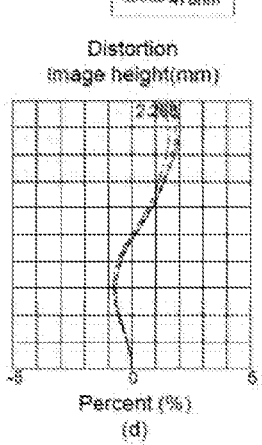

Reference is now made to FIGS. 10-13. FIG. 10 illustrates an example cross-sectional view of an optical imaging lens 3 having five lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the optical imaging lens 3 of the present embodiment, in an order from an object side A1 to an image side A2 along an optical axis, comprises a first lens element 310, an aperture stop 300, a second lens element 320, a third lens element 330, a fourth lens element 340 and a fifth lens element 350.

The differences between the third embodiment and the second embodiment are the radius of curvature and thickness of each lens element, the distance of each air gap and the surface shape of the object-side surface 341, but the configuration of the positive/negative refracting power of the first, second, third, fourth and fifth lens elements 310, 320, 330, 340, 350 and configuration of the concave/convex shape of surfaces, comprising the object-side surfaces 311, 321, 331, 351 facing to the object side A1 and the image-side surfaces 312, 322, 332, 342, 352 facing to the image side A2, are similar to those in the second embodiment. Specifically, the object-side surface 341 of the fourth lens element 340 comprises a concave portion 3411 in a vicinity of the optical axis, a concave portion 3412 in a vicinity of a periphery of the fourth lens element 340 and a convex portion 3413 between the vicinity of the optical axis and the vicinity of the periphery of the fourth lens element 340. Please refer to FIG. 12 for the optical characteristics of each lens elements in the optical imaging lens 3 of the present embodiment, wherein the values of T1, T2, T3, T4, G12, G23, V2, V3, EFL, BFL, TTL, T3/G12, EFL/T2, EFL/G12, EFL/T4, BFL/G12, BFL/T1, EFL/T1, BFL/T4, |V2-V3| and T4/G23 are:

T1=0.41 (mm);
T2=0.32 (mm);
T3=0.23 (mm);
T4=0.58 (mm);
G12=0.31 (mm);
G23=0.25 (mm);
V2=55.71 (mm);
V3=23.26 (mm);
EFL=2.39 (mm);
BFL=0.94 (mm);
TTL=3.47 (mm);
T3/G12=0.76;
EFL/T2=7.39;
EFL/G12=7.78;
EFL/T4=4.11;
BFL/G12=3.05;
BFL/T1=2.31;
EFL/T1=5.88;
BFL/T4=1.61;
|V2-V3|=32.46;
T4/G23=2.31.

The distance from the object-side surface 311 of the first lens element 310 to the image plane 370 along the optical axis is 3.47 mm and the length of the optical imaging lens 3 is shortened.

Please note that the HFOV of the optical imaging lens 3 reaches 43.00 degrees and meanwhile the length thereof is shortened to only 3.47 mm. Thus, the optical imaging lens 3 is capable to provide excellent imaging quality for smaller sized mobile devices.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 3 is effectively shortened.

Figure 14:
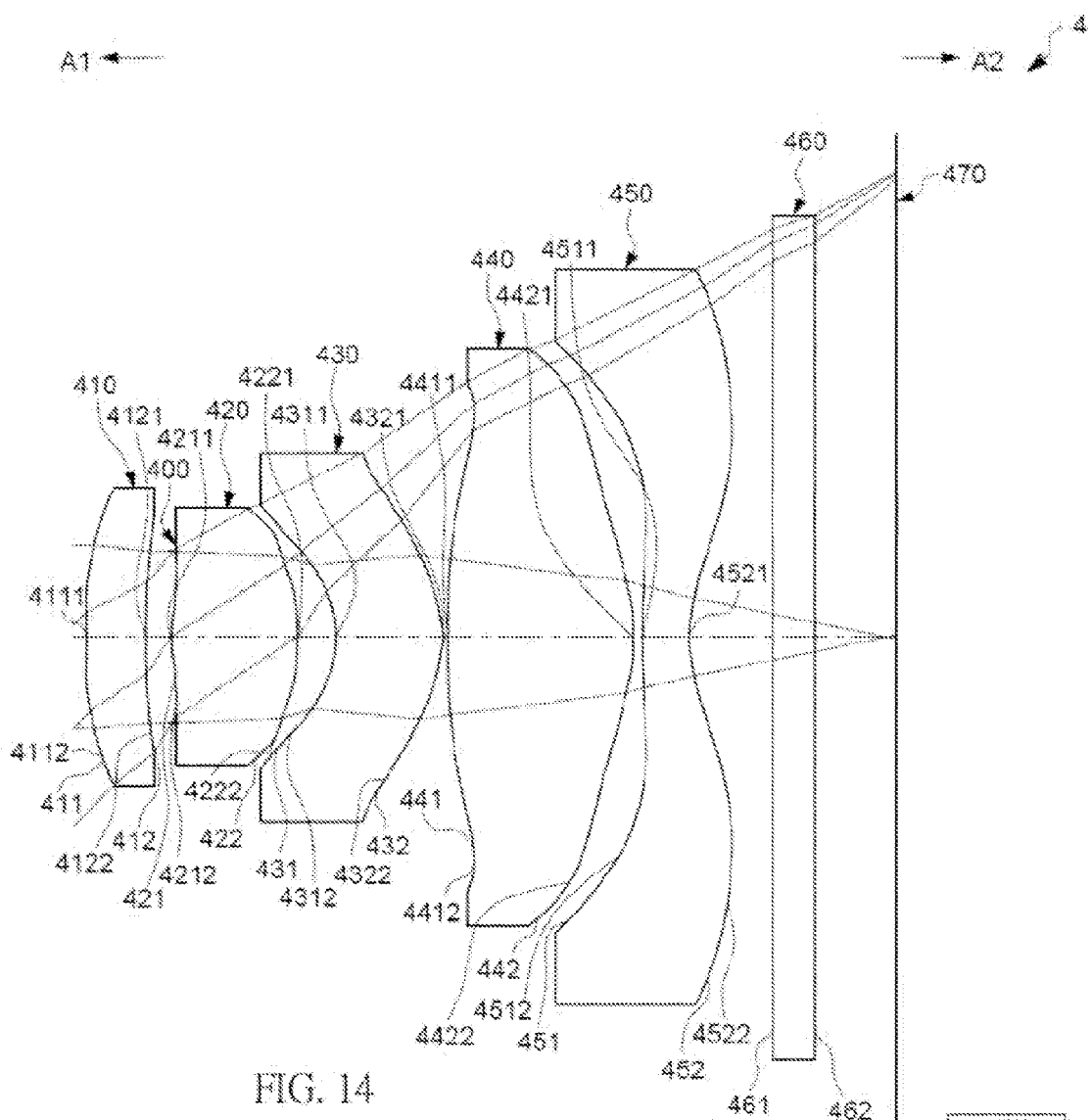
FIG. 14 is a cross-sectional view of a fourth embodiment of an optical imaging lens having five lens elements according to the present disclosure.
Figure 15:
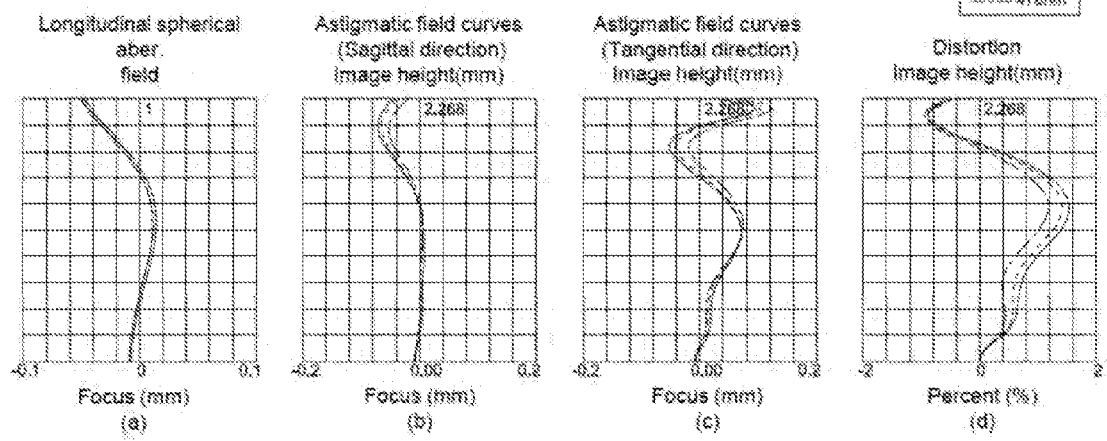
FIG. 15 is a chart of longitudinal spherical aberration and other kinds of optical aberrations of a fourth embodiment of the optical imaging lens according the present disclosure.

Reference is now made to FIGS. 14-17. FIG. 14 illustrates an example cross-sectional view of an optical imaging lens 4 having five lens elements of the optical imaging lens according to a fourth example embodiment. FIG. 15 shows example charts of longitudinal spherical aberration and other kinds of optical aberrations of the optical imaging lens 4 according to the fourth embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the optical imaging lens 4 of the present embodiment, in an order from an object side A1 to an image side A2 along an optical axis, comprises a first lens element 410, an aperture stop 400, a second lens element 420, a third lens element 430, a fourth lens element 440 and a fifth lens element 450.

The differences between the fourth embodiment and the second embodiment are the radius of curvature and thickness of each lens element and the distance of each air gap, but the configuration of the positive/negative refracting power of the first, second, third, fourth and fifth lens elements 410, 420, 430, 440, 450 and configuration of the concave/convex shape of surfaces, comprising the object-side surfaces 411, 421, 431, 441, 451 facing to the object side A1 and the image-side surfaces 412, 422, 432, 442, 452 facing to the image side A2, are similar to those in the second embodiment. Please refer to FIG. 16 for the optical characteristics of each lens elements in the optical imaging lens 4 of the present embodiment, wherein the values of T1, T2, T3, T4, G12, G23, V2, V3, EFL, BFL, TTL, T3/G12, EFL/T2, EFL/G12, EFL/T4, BFL/G12, BFL/T1, EFL/T1, BFL/T4, |V2-V3| and T4/G23 are:

T1=0.30 (mm);
T2=0.60 (mm);
T3=0.51 (mm);
T4=0.91 (mm);
G12=0.14 (mm);
G23=0.19 (mm);
V2=55.71 (mm);
V3=23.26 (mm);
EFL=2.11 (mm);
BFL=1.01 (mm);
TTL=3.97 (mm);
T3/G12=3.50;
EFL/T2=3.54;
EFL/G12=14.59;
EFL/T4=2.33;
BFL/G12=6.99;
BFL/T1=3.39;
EFL/T1=7.07;
BFL/T4=1.12;
|V2-V3|=32.46;
T4/G23=4.75.

The distance from the object-side surface 411 of the first lens element 410 to the image plane 470 along the optical axis is 3.97 mm and the length of the optical imaging lens 4 is shortened.

Please note that the HFOV of the optical imaging lens 4 reaches 46.97 degrees and meanwhile the length thereof is shortened to only 3.97 mm. Thus, the optical imaging lens 4 is capable to provide excellent imaging quality for smaller sized mobile devices.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 4 is effectively shortened.

Figure 18:
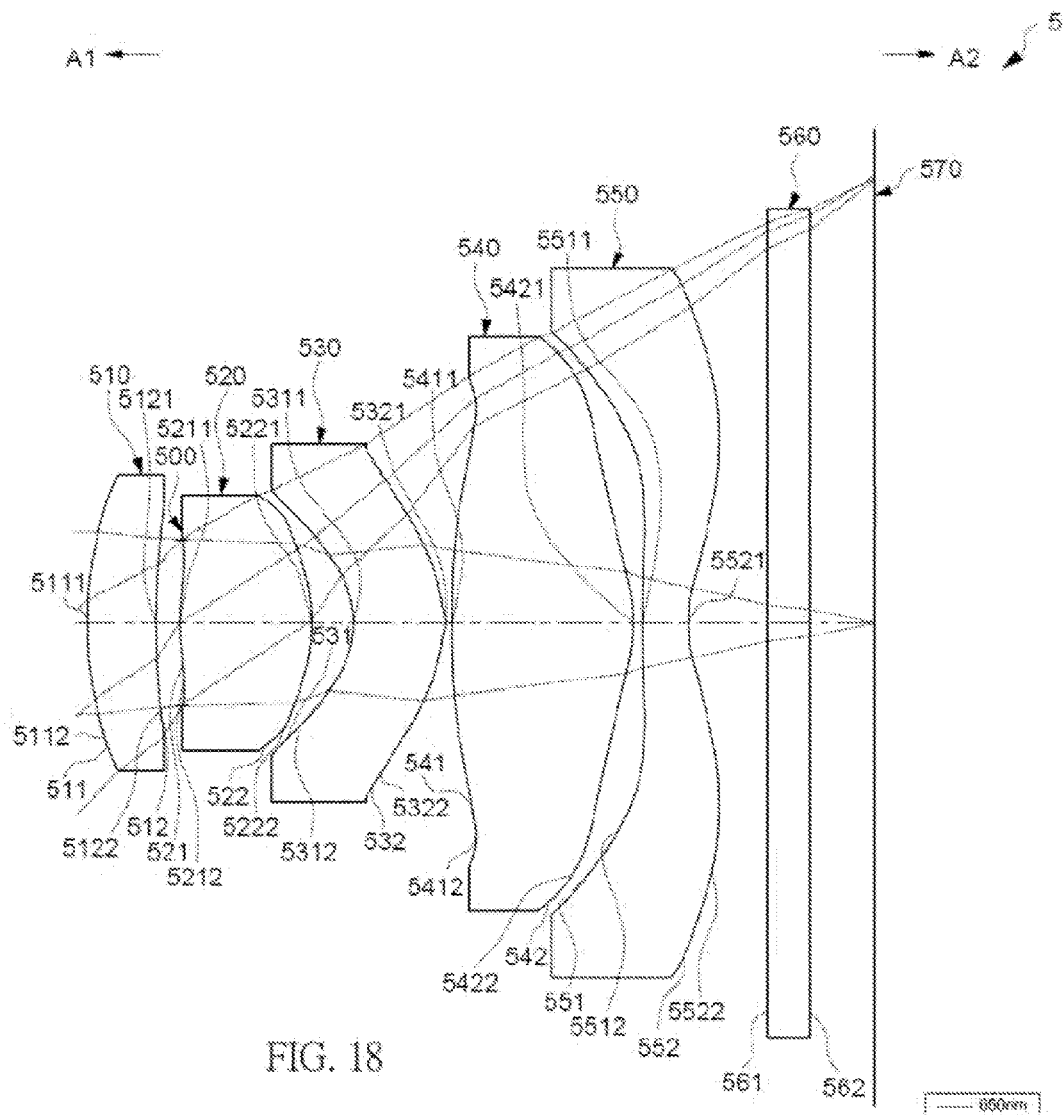
FIG. 18 is a cross-sectional view of a fifth embodiment of an optical imaging lens having five lens elements according to the present disclosure.
Figure 19:
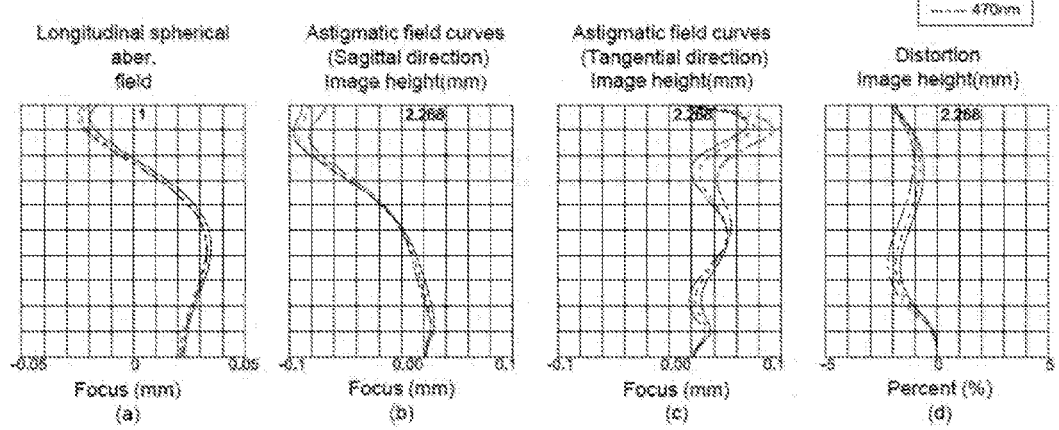
FIG. 19 is a chart of longitudinal spherical aberration and other kinds of optical aberrations of a fifth embodiment of the optical imaging lens according the present disclosure.

Reference is now made to FIGS. 18-21. FIG. 18 illustrates an example cross-sectional view of an optical imaging lens 5 having five lens elements of the optical imaging lens according to a fifth example embodiment. FIG. 19 shows example charts of longitudinal spherical aberration and other kinds of optical aberrations of the optical imaging lens 5 according to the fifth embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 18, the optical imaging lens 5 of the present embodiment, in an order from an object side A1 to an image side A2 along an optical axis, comprises a first lens element 510, an aperture stop 500, a second lens element 520, a third lens element 530, a fourth lens element 540 and a fifth lens element 550.

The differences between the fifth embodiment and the second embodiment are the radius of curvature and thickness of each lens element and the distance of each air gap, but the configuration of the positive/negative refracting power of the first, second, third, fourth and fifth lens elements 510, 520, 530, 540, 550 and configuration of the concave/convex shape of surfaces, comprising the object-side surfaces 511, 521, 531, 541, 551 facing to the object side A1 and the image-side surfaces 512, 522, 532, 542, 552 facing to the image side A2, are similar to those in the second embodiment. Please refer to FIG. 20 for the optical characteristics of each lens elements in the optical imaging lens 5 of the present embodiment, wherein the values of T1, T2, T3, T4, G12, G23, V2, V3, EFL, BFL, TTL, T3/G12, EFL/T2, EFL/G12, EFL/T4, BFL/G12, BFL/T1, EFL/T1, BFL/T4, |V2-V3| and T4/G23 are:

T1=0.35 (mm);
T2=0.65 (mm);
T3=0.45 (mm);
T4=0.91 (mm);
G12=0.13 (mm);
G23=0.21 (mm);
V2=55.71 (mm);
V3=23.26 (mm);
EFL=2.21 (mm);
BFL=0.94 (mm);
TTL=3.97 (mm);
T3/G12=3.36;
EFL/T2=3.39;
EFL/G12=16.46;
EFL/T4=2.42;
BFL/G12=7.00;
BFL/T1=2.72;
EFL/T1=6.40;

BFL/T4=1.03;
|V2-V3|=32.46;
T4/G23=4.29.

The distance from the object-side surface 511 of the first lens element 510 to the image plane 570 along the optical axis is 3.97 mm and the length of the optical imaging lens 5 is shortened.

Please note that the HFOV of the optical imaging lens 5 reaches 46.36 degrees and meanwhile the length thereof is shortened to only 3.97 mm. Thus, the optical imaging lens 5 is capable to provide excellent imaging quality for smaller sized mobile devices.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 5 is effectively shortened.

Figure 22:
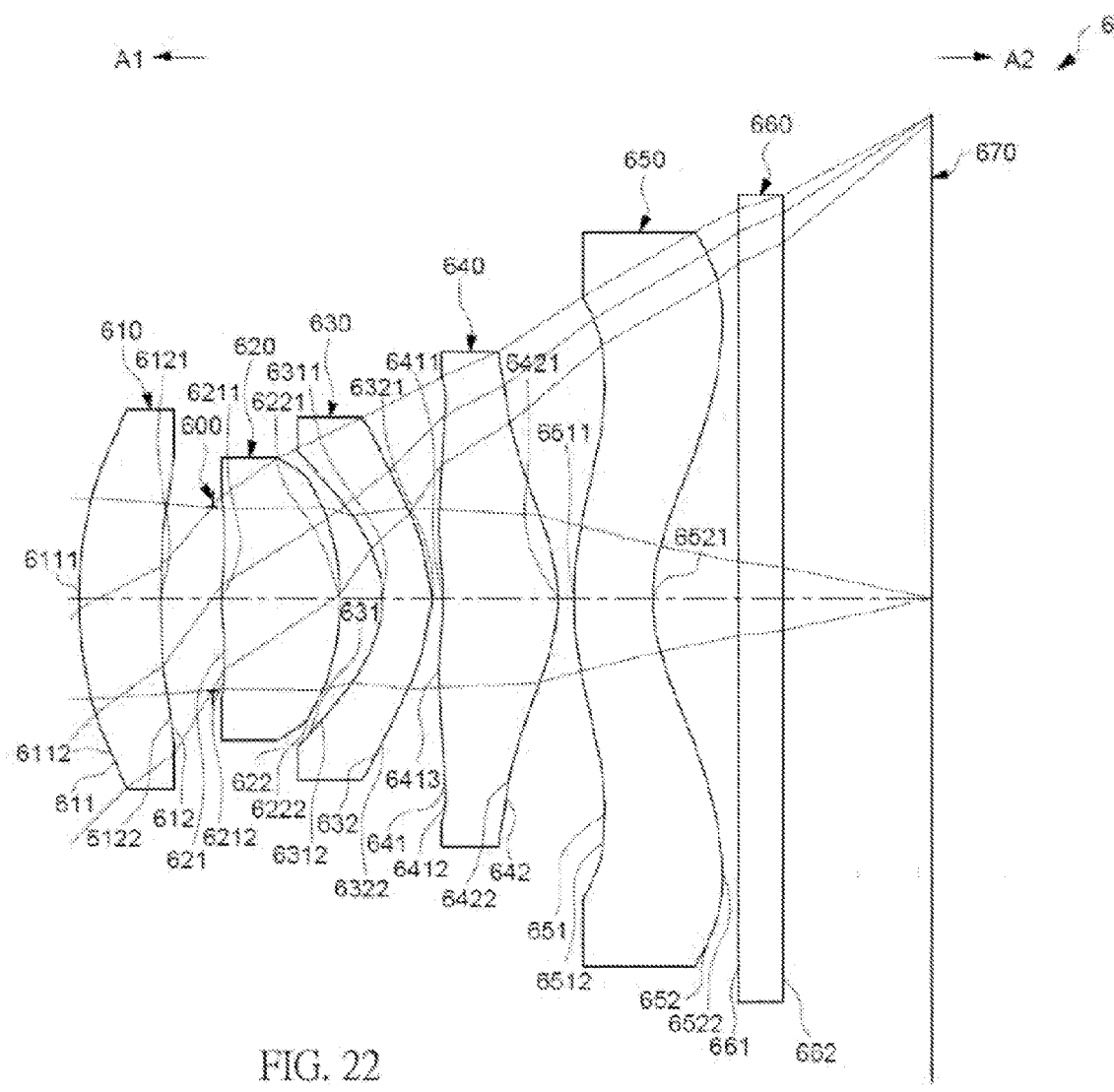
FIG. 22 is a cross-sectional view of a sixth embodiment of an optical imaging lens having five lens elements according to the present disclosure.
Figure 23:
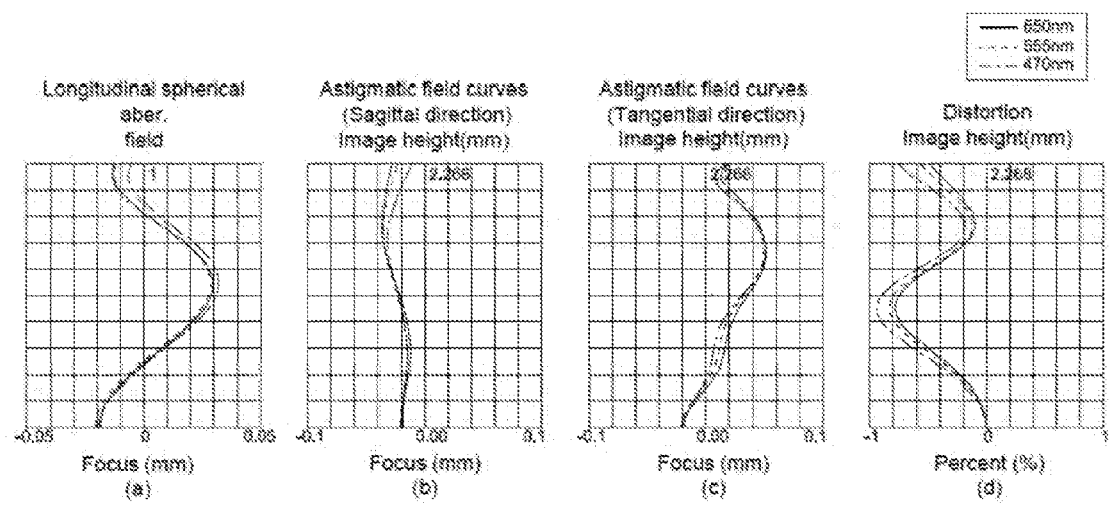
FIG. 23 is a chart of longitudinal spherical aberration and other kinds of optical aberrations of a sixth embodiment of the optical imaging lens according the present disclosure.

Reference is now made to FIGS. 22-25. FIG. 22 illustrates an example cross-sectional view of an optical imaging lens 6 having five lens elements of the optical imaging lens according to a sixth example embodiment. FIG. 23 shows example charts of longitudinal spherical aberration and other kinds of optical aberrations of the optical imaging lens 6 according to the sixth embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the optical imaging lens 6 of the present embodiment, in an order from an object side A1 to an image side A2 along an optical axis, comprises a first lens element 610, an aperture stop 600, a second lens element 620, a third lens element 630, a fourth lens element 640 and a fifth lens element 650.

The differences between the sixth embodiment and the third embodiment are the radius of curvature and thickness of each lens element and the distance of each air gap, but the configuration of the positive/negative refracting power of the first, second, third, fourth and fifth lens elements 610, 620, 630, 640, 650 and configuration of the concave/convex shape of surfaces, comprising the object-side surfaces 611, 621, 631, 641, 651 facing to the object side A1 and the image-side surfaces 612, 622, 632, 642, 652 facing to the image side A2, are similar to those in the third embodiment. Please refer to FIG. 24 for the optical characteristics of each lens elements in the optical imaging lens 6 of the present embodiment, wherein the values of T1, T2, T3, T4, G12, G23, V2, V3, EFL, BFL, TTL, T3/G12, EFL/T2, EFL/G12, EFL/T4, BFL/G12, BFL/T1, EFL/T1, BFL/T4, |V2-V3| and T4/G23 are:

T1=0.38 (mm);
T2=0.54 (mm);
T3=0.22 (mm);
T4=0.55 (mm);
G12=0.30 (mm);
G23=0.20 (mm);
V2=55.71 (mm);
V3=23.26 (mm);
EFL=2.27 (mm);
BFL=1.31 (mm);
TTL=3.99 (mm);
T3/G12=0.73;
EFL/T2=4.25;
EFL/G12=7.57;
EFL/T4=4.16;
BFL/G12=4.34;
BFL/T1=3.47;
EFL/T1=6.06;
BFL/T4=2.38;
|V2-V3|=32.46;
T4/G23=2.72.

The distance from the object-side surface 611 of the first lens element 610 to the image plane 670 along the optical axis is 3.99 mm and the length of the optical imaging lens 6 is shortened.

Please note that the HFOV of the optical imaging lens 6 reaches 44.89 degrees and meanwhile the length thereof is shortened to only 3.99 mm. Thus, the optical imaging lens 6 is capable to provide excellent imaging quality for smaller sized mobile devices.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 6 is effectively shortened.

Figure 26:
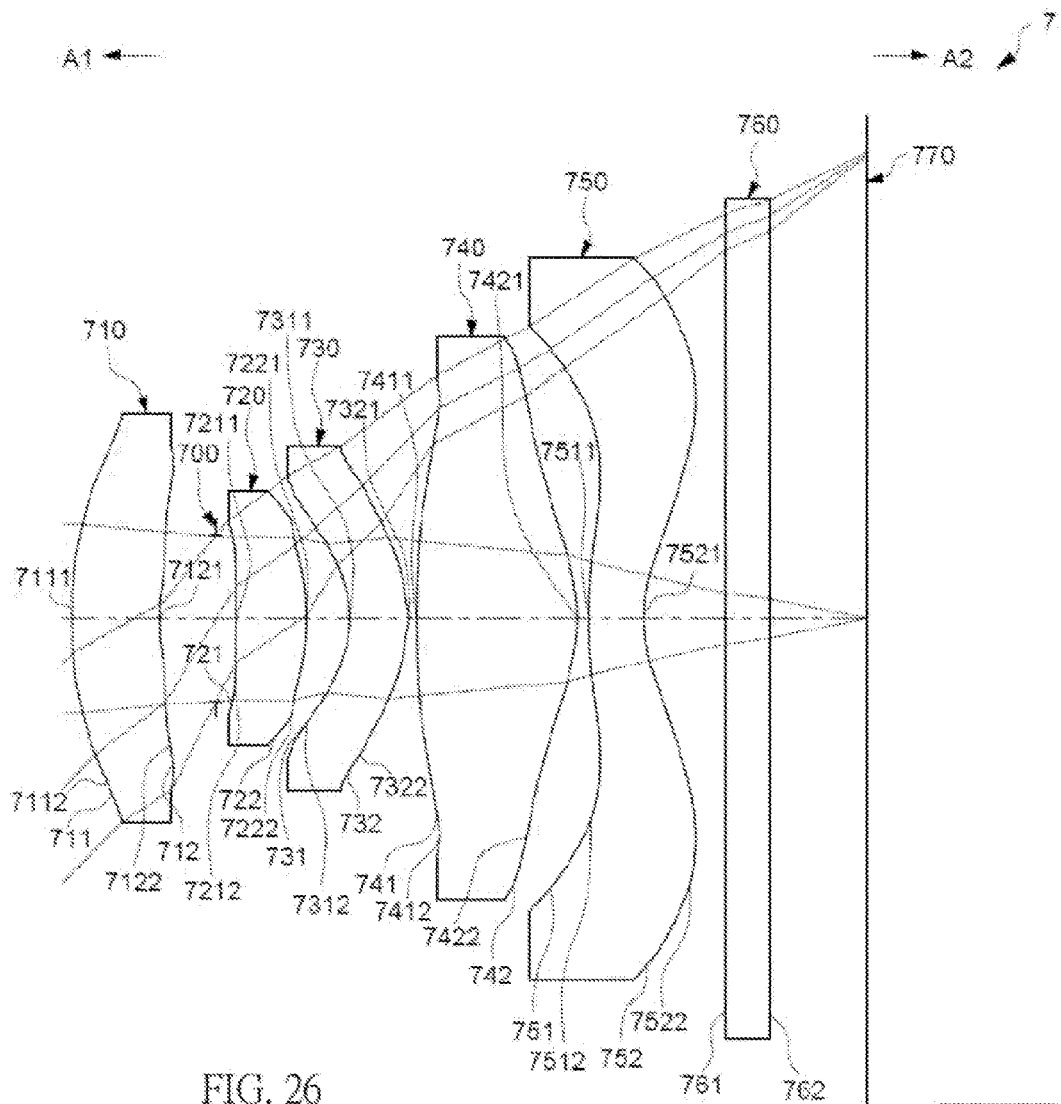
FIG. 26 is a cross-sectional view of a seventh embodiment of an optical imaging lens having five lens elements according to the present disclosure.
Figure 27:
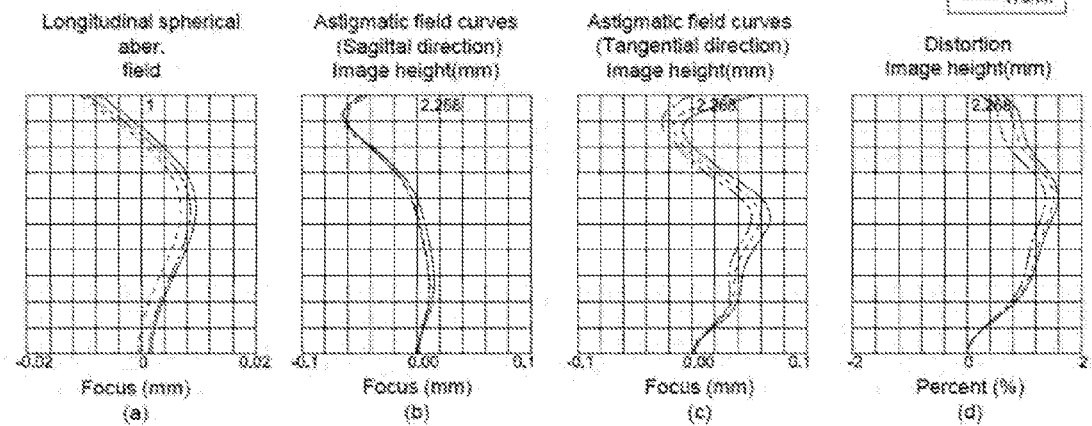
FIG. 27 is a chart of longitudinal spherical aberration and other kinds of optical aberrations of a seventh embodiment of the optical imaging lens according the present disclosure.

Reference is now made to FIGS. 26-29. FIG. 26 illustrates an example cross-sectional view of an optical imaging lens 7 having five lens elements of the optical imaging lens according to a seventh example embodiment. FIG. 27 shows example charts of longitudinal spherical aberration and other kinds of optical aberrations of the optical imaging lens 7 according to the seventh embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the optical imaging lens 7 of the present embodiment, in an order from an object side A1 to an image side A2 along an optical axis, comprises a first lens element 710, an aperture stop 700, a second lens element 720, a third lens element 730, a fourth lens element 740 and a fifth lens element 750.

The differences between the seventh embodiment and the first embodiment are the radius of curvature and thickness of each lens element, the distance of each air gap and the configuration of the concave/convex shape of the image-side surface 712, but the configuration of the positive/negative refracting power of the first, second, third, fourth and fifth lens elements 710, 720, 730, 740, 750 and configuration of the concave/convex shape of surfaces, comprising the object-side surfaces 711, 721, 731, 741, 751 facing to the object side A1 and the image-side surfaces 722, 732, 742, 752 facing to the image side A2, are similar to those in the first embodiment. Specifically, the image-side surface 712 of the first lens element 710 comprises a concave portion 7121 in a vicinity of the optical axis and a convex portion 7122 in a vicinity of a periphery of the first lens element 710. Please refer to FIG. 28 for the optical characteristics of each lens elements in the optical imaging lens 7 of the present embodiment, wherein the values of T1, T2, T3, T4, G12, G23, V2, V3, EFL, BFL, TTL, T3/G12, EFL/T2, EFL/G12, EFL/T4, BFL/G12, BFL/T1, EFL/T1, BFL/T4, |V2-V3| and T4/G23 are:

T1=0.44 (mm);
T2=0.34 (mm);
T3=0.28 (mm);
T4=0.78 (mm);
G12=0.36 (mm);
G23=0.21 (mm);
V2=55.11 (mm);
V3=21.67 (mm);
EFL=2.21 (mm);
BFL=1.09 (mm);
TTL=3.88 (mm);
T3/G12=0.78;
EFL/T2=6.49;
EFL/G12=6.22;
EFL/T4=2.84;
BFL/G12=3.05;
BFL/T1=2.44;
EFL/T1=4.98;
BFL/T4=1.40;
|V2-V3|=34.45;
T4/G23=3.65.

The distance from the object-side surface 711 of the first lens element 710 to the image plane 770 along the optical axis is 3.88 mm and the length of the optical imaging lens 7 is shortened.

Please note that the HFOV of the optical imaging lens 7 reaches 45.50 degrees and meanwhile the length thereof is shortened to only 3.88 mm. Thus, the optical imaging lens 7 is capable to provide excellent imaging quality for smaller sized mobile devices.

As shown in FIG. 27, the optical imaging lens 7 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 7 is effectively shortened.

Figure 30:
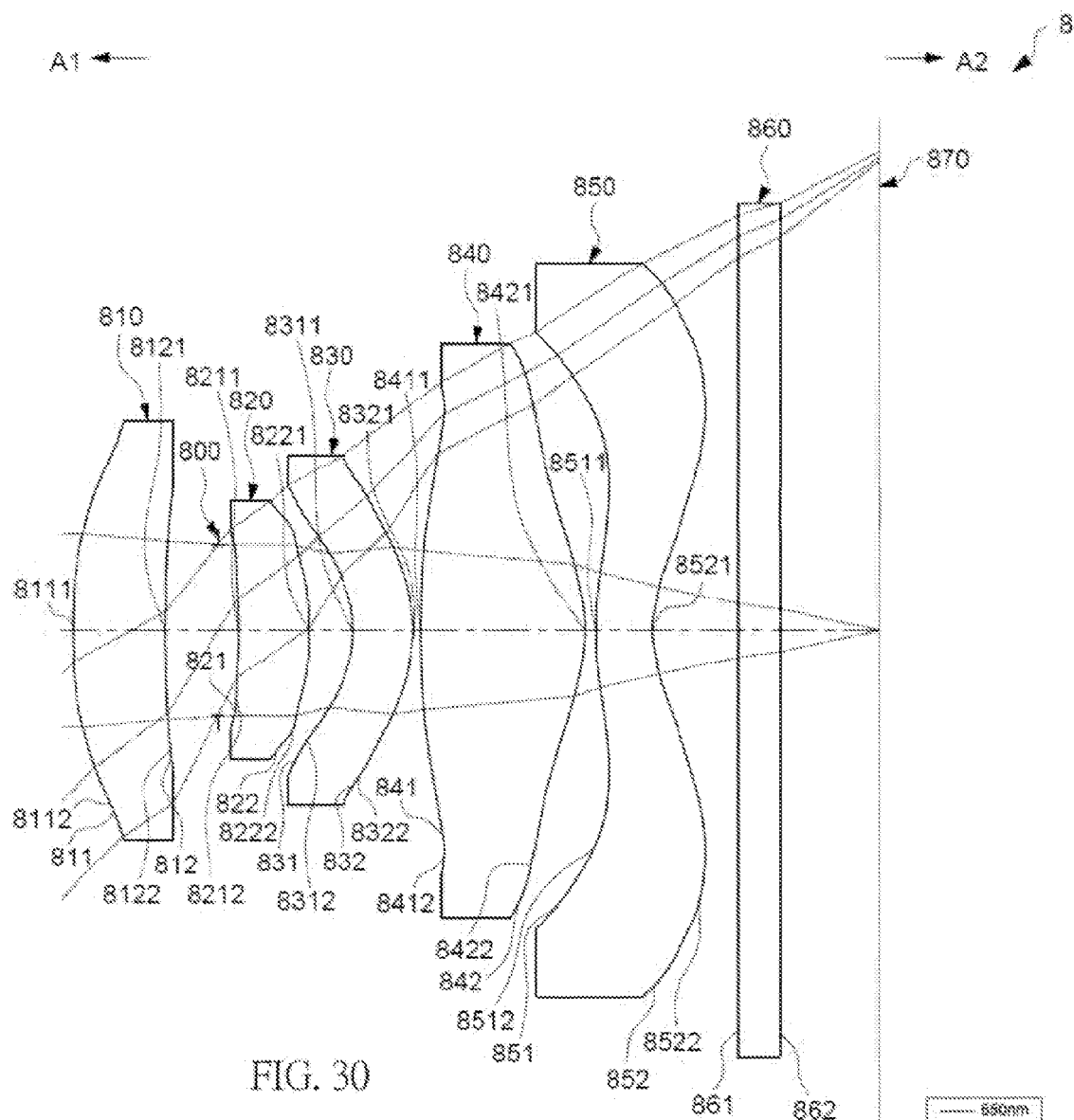
FIG. 30 is a cross-sectional view of an eighth embodiment of an optical imaging lens having five lens elements according to the present disclosure.
Figure 31:
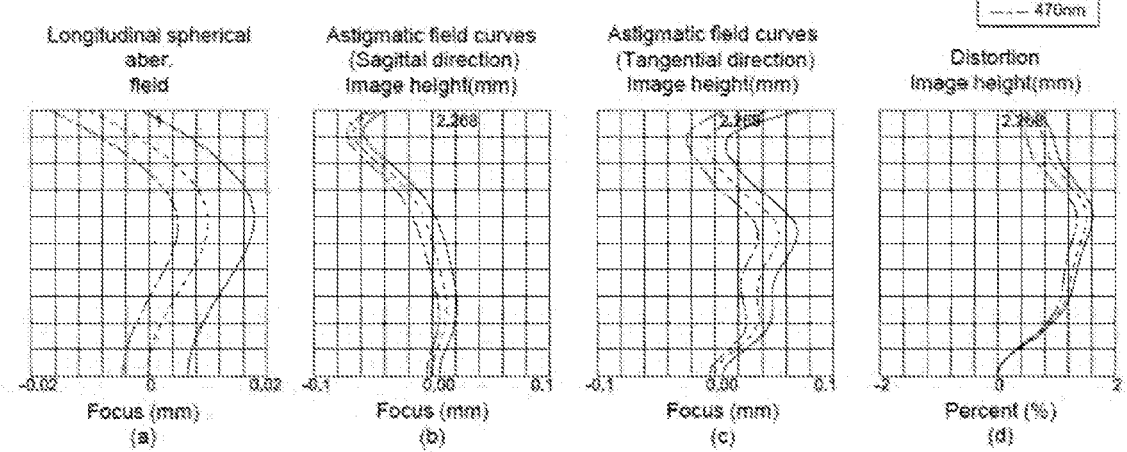
FIG. 31 is a chart of longitudinal spherical aberration and other kinds of optical aberrations of an eighth embodiment of the optical imaging lens according the present disclosure.

Reference is now made to FIGS. 30-33. FIG. 30 illustrates an example cross-sectional view of an optical imaging lens 8 having five lens elements of the optical imaging lens according to an eighth example embodiment. FIG. 31 shows example charts of longitudinal spherical aberration and other kinds of optical aberrations of the optical imaging lens 8 according to the eighth embodiment. FIG. 32 shows an example table of optical data of each lens element of the optical imaging lens 8 according to the eighth example embodiment. FIG. 33 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 30, the optical imaging lens 8 of the present embodiment, in an order from an object side A1 to an image side A2 along an optical axis, comprises a first lens element 810, an aperture stop 800, a second lens element 820, a third lens element 830, a fourth lens element 840 and a fifth lens element 850.

The differences between the eighth embodiment and the first embodiment are the radius of curvature and thickness of each lens element and the distance of each air gap, but the configuration of the positive/negative refracting power of the first, second, third, fourth and fifth lens elements 810, 820, 830, 840, 850 and configuration of the concave/convex shape of surfaces, comprising the object-side surfaces 811, 821, 831, 841, 851 facing to the object side A1 and the image-side surfaces 812, 822, 832, 842, 852 facing to the image side A2, are similar to those in the first embodiment. Please refer to FIG. 32 for the optical characteristics of each lens elements in the optical imaging lens 8 of the present embodiment, wherein the values of T1, T2, T3, T4, G12, G23, V2, V3, EFL, BFL, TTL, T3/G12, EFL/T2, EFL/G12, EFL/T4, BFL/G12, BFL/T1, EFL/T1, BFL/T4, |V2-V3| and T4/G23 are:

T1=0.44 (mm);
T2=0.34 (mm);
T3=0.28 (mm);
T4=0.78 (mm);
G12=0.35 (mm);
G23=0.21 (mm);
V2=49.62 (mm);
V3=30.19 (mm);
EFL=2.21 (mm);
BFL=1.09 (mm);
TTL=3.87 (mm);
T3/G12=0.79;
EFL/T2=6.50;
EFL/G12=6.28;
EFL/T4=2.84;
BFL/G12=3.09;
BFL/T1=2.46;
EFL/T1=4.99;
BFL/T4=1.40;
|V2-V3|=19.43;
T4/G23=3.69.

The distance from the object-side surface 811 of the first lens element 810 to the image plane 870 along the optical axis is 3.87 mm and the length of the optical imaging lens 8 is shortened.

Please note that the HFOV of the optical imaging lens 8 reaches 45.50 degrees and meanwhile the length thereof is shortened to only 3.87 mm. Thus, the optical imaging lens 8 is capable to provide excellent imaging quality for smaller sized mobile devices.

As shown in FIG. 31, the optical imaging lens 8 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 8 is effectively shortened.

Figure 34:
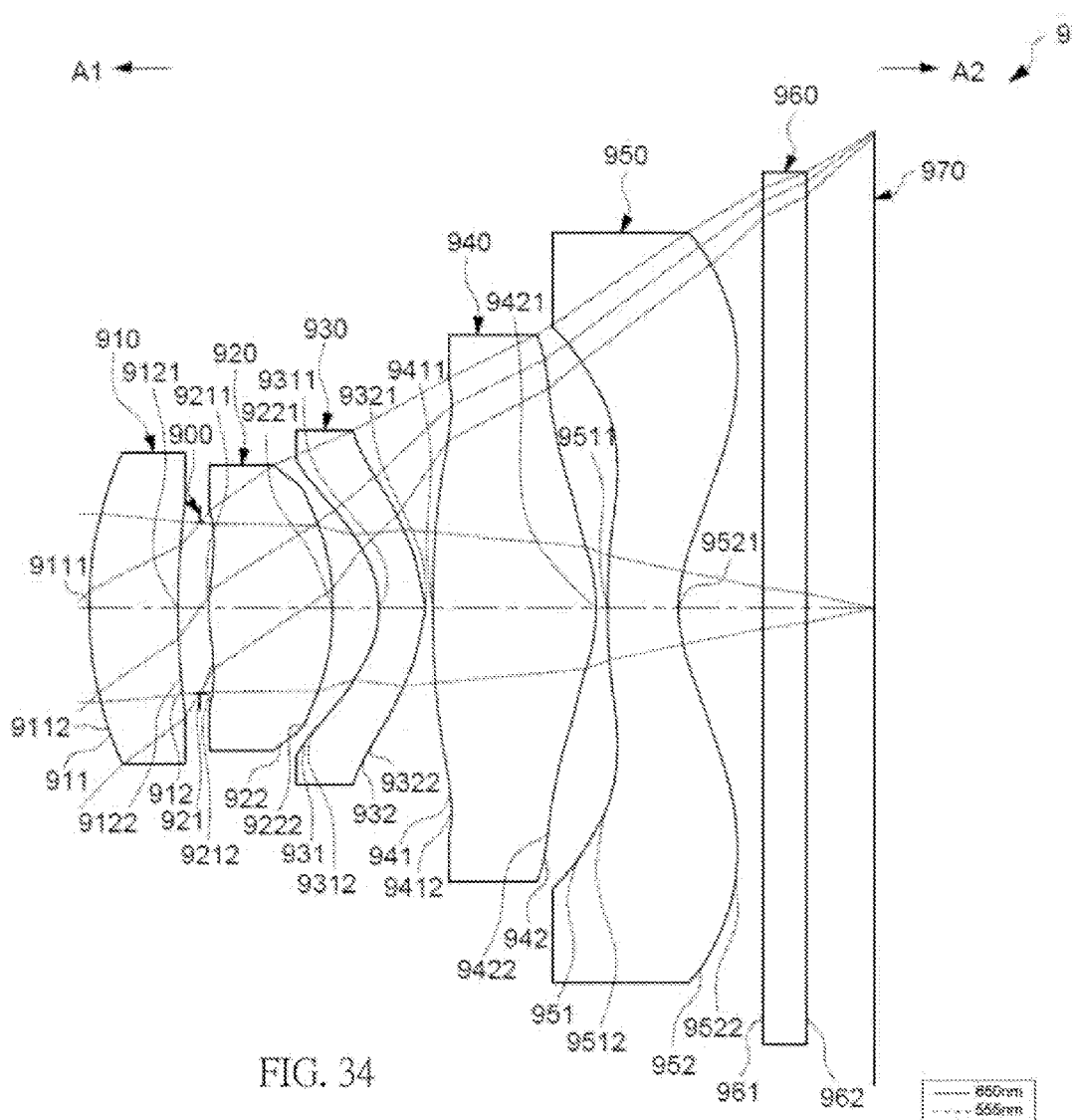
FIG. 34 is a cross-sectional view of a ninth embodiment of an optical imaging lens having five lens elements according to the present disclosure.
Figure 35:
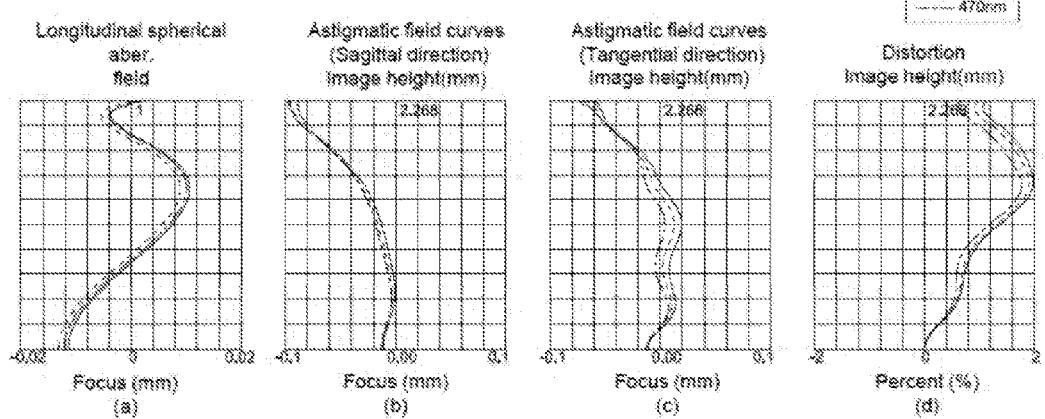
FIG. 35 is a chart of longitudinal spherical aberration and other kinds of optical aberrations of a ninth embodiment of the optical imaging lens according the present disclosure.

Reference is now made to FIGS. 34-37. FIG. 34 illustrates an example cross-sectional view of an optical imaging lens 9 having five lens elements of the optical imaging lens according to a ninth example embodiment. FIG. 35 shows example charts of longitudinal spherical aberration and other kinds of optical aberrations of the optical imaging lens 9 according to the ninth embodiment. FIG. 36 shows an example table of optical data of each lens element of the optical imaging lens 9 according to the ninth example embodiment. FIG. 37 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 34, the optical imaging lens 9 of the present embodiment, in an order from an object side A1 to an image side A2 along an optical axis, comprises a first lens element 910, an aperture stop 900, a second lens element 920, a third lens element 930, a fourth lens element 940 and a fifth lens element 950.

The differences between the ninth embodiment and the second embodiment are the radius of curvature and thickness of each lens element and the distance of each air gap, but the configuration of the positive/negative refracting power of the first, second, third, fourth and fifth lens elements 910, 920, 930, 940, 950 and configuration of the concave/convex shape of surfaces, comprising the object-side surfaces 911, 921, 931, 941, 951 facing to the object side A1 and the image-side surfaces 912, 922, 932, 942, 952 facing to the image side A2, are similar to those in the second embodiment. Please refer to FIG. 36 for the optical characteristics of each lens elements in the optical imaging lens 9 of the present embodiment, wherein the values of T1, T2, T3, T4, G12, G23, V2, V3, EFL, BFL, TTL, T3/G12, EFL/T2, EFL/G12, EFL/T4, BFL/G12, BFL/T1, EFL/T1, BFL/T4, |V2-V3| and T4/G23 are:

T1=0.42 (mm);
T2=0.57 (mm);
T3=0.21 (mm);
T4=0.77 (mm);
G12=0.17 (mm);
G23=0.22 (mm);
V2=55.71 (mm);
V3=23.26 (mm);
EFL=2.15 (mm);
BFL=0.93 (mm);
TTL=3.73 (mm);
T3/G12=1.24;
EFL/T2=3.80;
EFL/G12=12.76;
EFL/T4=2.79;
BFL/G12=5.53;
BFL/T1=2.21;
EFL/T1=5.11;
BFL/T4=1.21;
|V2-V3|=32.46;
T4/G23=3.51.

The distance from the object-side surface 911 of the first lens element 910 to the image plane 970 along the optical axis is 3.73 mm and the length of the optical imaging lens 9 is shortened.

Please note that the HFOV of the optical imaging lens 9 reaches 45.90 degrees and meanwhile the length thereof is shortened to only 3.73 mm. Thus, the optical imaging lens 9 is capable to provide excellent imaging quality for smaller sized mobile devices.

As shown in FIG. 35, the optical imaging lens 9 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 9 is effectively shortened.

Figure 38:
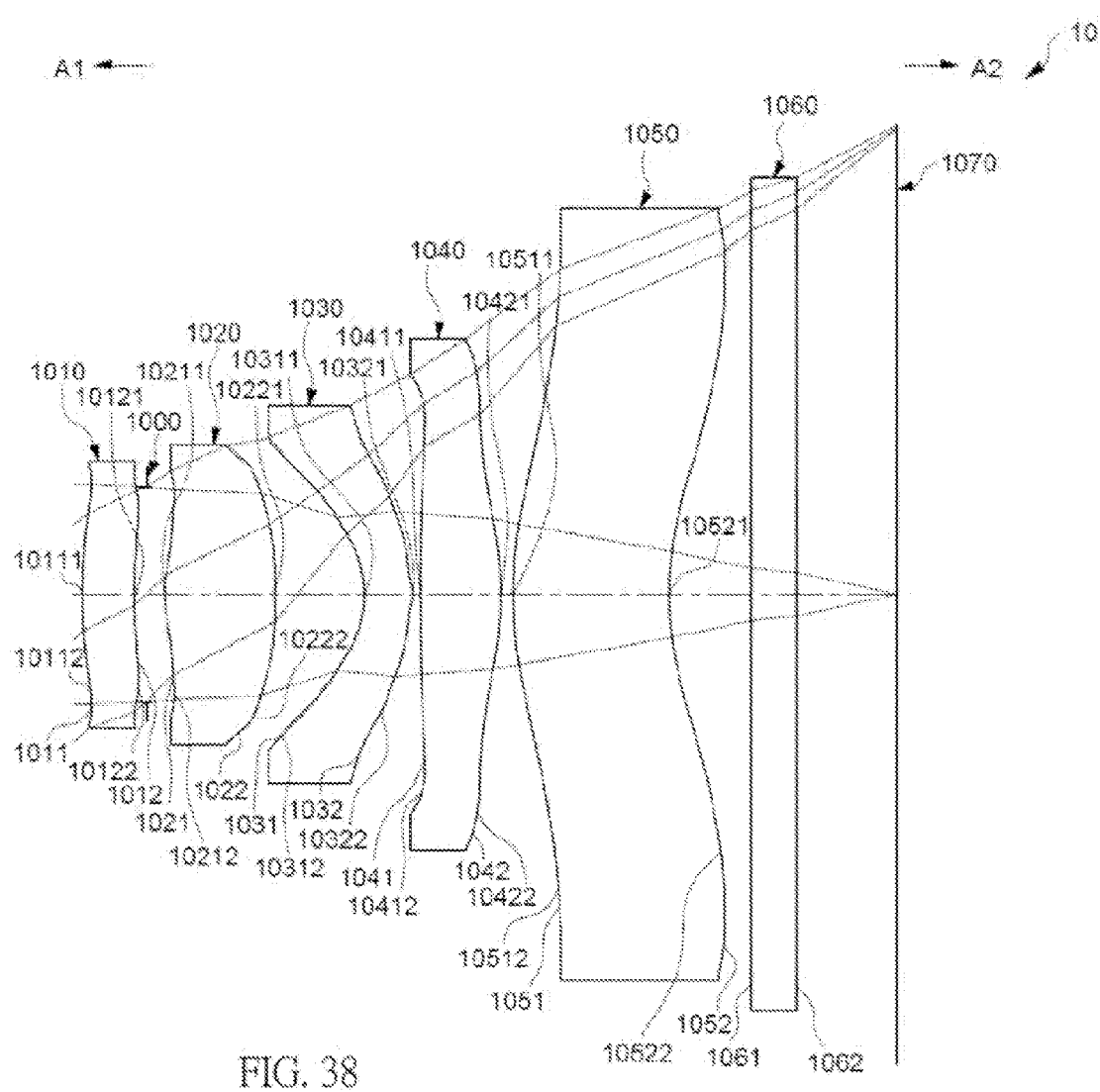
FIG. 38 is a cross-sectional view of a tenth embodiment of an optical imaging lens having five lens elements according to the present disclosure.
Figure 39:
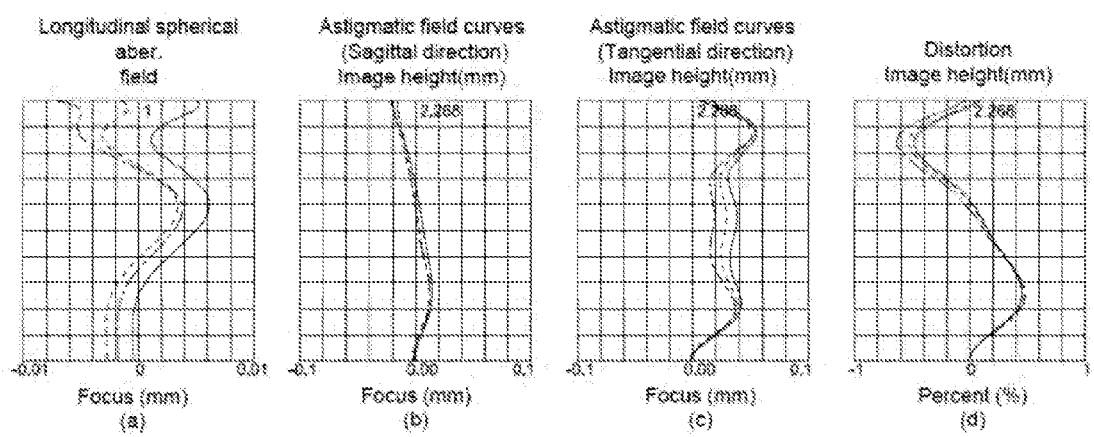
FIG. 39 is a chart of longitudinal spherical aberration and other kinds of optical aberrations of a tenth embodiment of the optical imaging lens according the present disclosure.

Reference is now made to FIGS. 38-41. FIG. 38 illustrates an example cross-sectional view of an optical imaging lens 10 having five lens elements of the optical imaging lens according to a tenth example embodiment. FIG. 39 shows example charts of longitudinal spherical aberration and other kinds of optical aberrations of the optical imaging lens 10 according to the tenth embodiment. FIG. 40 shows an example table of optical data of each lens element of the optical imaging lens 10 according to the tenth example embodiment. FIG. 41 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 38, the optical imaging lens 10 of the present embodiment, in an order from an object side A1 to an image side A2 along an optical axis, comprises a first lens element 1010, an aperture stop 1000, a second lens element 1020, a third lens element 1030, a fourth lens element 1040 and a fifth lens element 1050.

The differences between the tenth embodiment and the second embodiment are the radius of curvature and thickness of each lens element, the distance of each air gap and the configuration of the concave/convex shape of the object-side surface 1011 and the image-side surface 1012, but the configuration of the positive/negative refracting power of the first, second, third, fourth and fifth lens elements 1010, 1020, 1030, 1040, 1050 and configuration of the concave/convex shape of surfaces, comprising the object-side surfaces 1021, 1031, 1041, 1051 facing to the object side A1 and the image-side surfaces 1022, 1032, 1042, 1052 facing to the image side A2, are similar to those in the second embodiment, and the object-side surface 1051 of the fifth lens element 1050 is a convex surface comprising a convex portion 10511 in a vicinity of the optical axis and a convex portion 10512 in a vicinity of a periphery of the fifth lens element 1050. Specifically, the object-side surface 1011 of the first lens element 1010 comprises a convex portion 10111 in a vicinity of the optical axis and a concave portion 10112 in a vicinity of a periphery of the first lens element 1010, and the image-side surface 1012 of the first lens element 1010 comprises a concave portion 10121 in a vicinity of the optical axis and a convex portion 10122 in a vicinity of a periphery of the first lens element 1010. Please refer to FIG. 36 for the optical characteristics of each lens elements in the optical imaging lens 10 of the present embodiment, wherein the values of T1, T2, T3, T4, G12, G23, V2, V3, EFL, BFL, TTL, T3/G12, EFL/T2, EFL/G12, EFL/T4, BFL/G12, BFL/T1, EFL/T1, BFL/T4, |V2-V3| and T4/G23 are:

T1=0.25 (mm);
T2=0.52 (mm);
T3=0.22 (mm);
T4=0.39 (mm);
G12=0.16 (mm);
G23=0.43 (mm);
V2=55.71 (mm);
V3=23.26 (mm);
EFL=2.61 (mm);
BFL=1.11 (mm);
TTL=3.95 (mm);
T3/G12=1.39;
EFL/T2=4.99;
EFL/G12=16.49;
EFL/T4=6.68;
BFL/G12=6.99;

BFL/T1=4.37;
EFL/T1=10.31;
BFL/T4=2.83;
|V2-V3|=32.46;
T4/G23=0.91.

The distance from the object-side surface 1011 of the first lens element 1010 to the image plane 1070 along the optical axis is 3.95 mm and the length of the optical imaging lens 10 is shortened.

Please note that the HFOV of the optical imaging lens 10 reaches 40.79 degrees and meanwhile the length thereof is shortened to only 3.95 mm. Thus, the optical imaging lens 10 is capable to provide excellent imaging quality for smaller sized mobile devices.

As shown in FIG. 39, the optical imaging lens 10 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 10 is effectively shortened.

Figure 42:
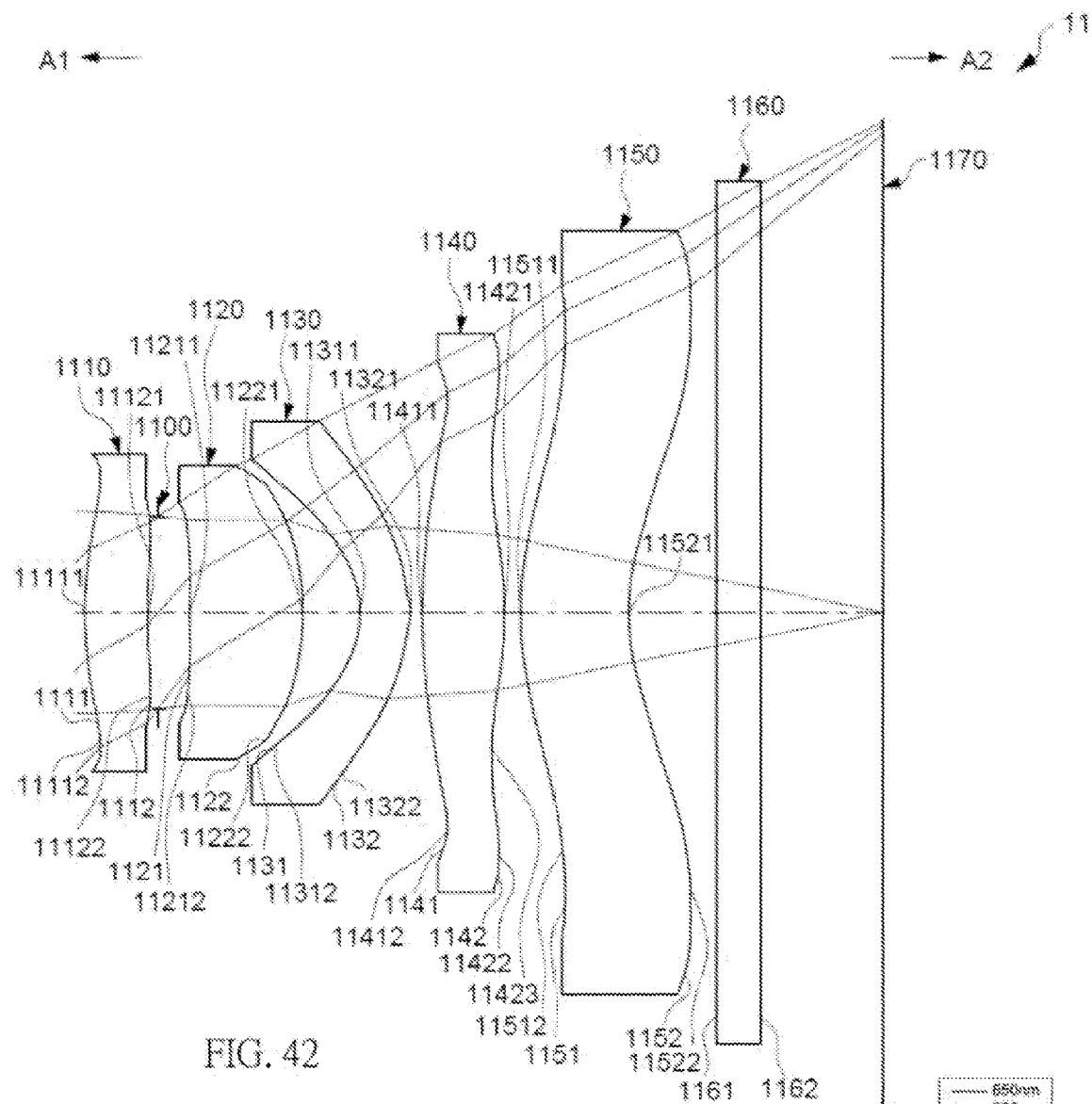
FIG. 42 is a cross-sectional view of an eleventh embodiment of an optical imaging lens having five lens elements according to the present disclosure.
Figure 43:
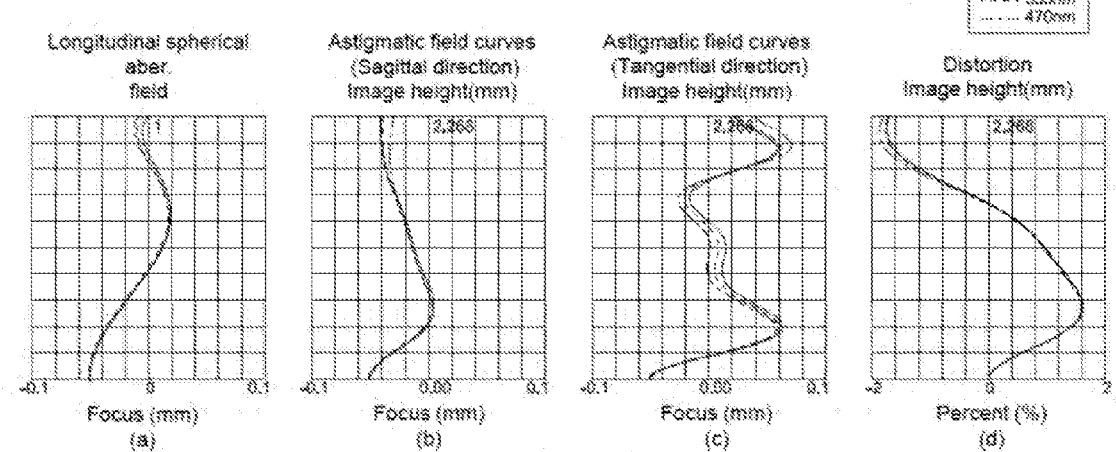
FIG. 43 is a chart of longitudinal spherical aberration and other kinds of optical aberrations of an eleventh embodiment of the optical imaging lens according the present disclosure.

Reference is now made to FIGS. 42-45. FIG. 42 illustrates an example cross-sectional view of an optical imaging lens 11 having five lens elements of the optical imaging lens according to a eleventh example embodiment. FIG. 43 shows example charts of longitudinal spherical aberration and other kinds of optical aberrations of the optical imaging lens 11 according to the eleventh embodiment. FIG. 44 shows an example table of optical data of each lens element of the optical imaging lens 11 according to the eleventh example embodiment. FIG. 45 shows an example table of aspherical data of the optical imaging lens 11 according to the eleventh example embodiment. The reference numbers labeled in the present embodiment are similar to those in the first embodiment for the similar elements, but here the reference numbers are initialed with 11, for example, reference number 1131 for labeling the object-side surface of the third lens element 1130, reference number 1132 for labeling the image-side surface of the third lens element 1130, etc.

As shown in FIG. 42, the optical imaging lens 11 of the present embodiment, in an order from an object side A1 to an image side A2 along an optical axis, comprises a first lens element 1110, an aperture stop 1100, a second lens element 1120, a third lens element 1130, a fourth lens element 1140 and a fifth lens element 1150.

The differences between the eleventh embodiment and the tenth embodiment are the radius of curvature and thickness of each lens element, the distance of each air gap and the configuration of the concave/convex shape of the object-side surface 1151 and the image-side surface 1142, but the configuration of the positive/negative refracting power of the first, second, third, fourth and fifth lens elements 1110, 1120, 1130, 1140, 1150 and configuration of the concave/convex shape of surfaces, comprising the object-side surfaces 1111, 1131, 1141 facing to the object side A1 and the image-side surfaces 1112, 1122, 1132, 1152 facing to the image side A2, are similar to those in the tenth embodiment, and the object-side surface 1121 of the second lens element 1120 is a concave surface. Specifically, the image-side surface 1142 of the fourth lens element 1140 comprises a convex portion 11421 in a vicinity of the optical axis, a convex portion 11422 in a vicinity of a periphery of the fourth lens element 1140 and a concave portion 11423 between the vicinity of the optical axis and the vicinity of the periphery of the fourth lens element 1140, and the object-side surface 1051 of the fifth lens element 1150 comprises a convex portion 11511 in a vicinity of the optical axis and a concave portion 11512 in a vicinity of a periphery of the fifth lens element 1050. Please refer to FIG. 44 for the optical characteristics of each lens elements in the optical imaging lens 11 of the present embodiment, wherein the values of T1, T2, T3, T4, G12, G23, V2, V3, EFL, BFL, TTL, T3/G12, EFL/T2, EFL/G12, EFL/T4, BFL/G12, BFL/T1, EFL/T1, BFL/T4, |V2-V3| and T4/G23 are:

T1=0.29 (mm);
T2=0.53 (mm);
T3=0.22 (mm);
T4=0.38 (mm);
G12=0.19 (mm);
G23=0.27 (mm);
V2=55.71 (mm);
V3=23.26 (mm);
EFL=2.29 (mm);
BFL=1.17 (mm);
TTL=3.70 (mm);
T3/G12=1.14;
EFL/T2=4.35;
EFL/G12=11.91;
EFL/T4=6.06;
BFL/G12=6.11;
BFL/T1=4.06;
EFL/T1=7.91;
BFL/T4=3.11;
|V2-V3|=32.46;
T4/G23=1.40.

The distance from the object-side surface 1111 of the first lens element 1110 to the image plane 1170 along the optical axis is 3.70 mm and the length of the optical imaging lens 11 is shortened.

Please note that the HFOV of the optical imaging lens 11 reaches 44.58 degrees and meanwhile the length thereof is shortened to only 3.70 mm. Thus, the optical imaging lens 11 is capable to provide excellent imaging quality for smaller sized mobile devices.

As shown in FIG. 43, the optical imaging lens 11 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 11 is effectively shortened.

Please refer to FIG. 46, which shows the values of T1, T2, T3, T4, G12, G23, V2, V3, EFL, BFL, TTL, T3/G12, EFL/T2, EFL/G12, EFL/T4, BFL/G12, BFL/T1, EFL/T1, BFL/T4, |V2-V3| and T4/G23 of all eleven embodiments, and it is clear that the optical imaging lens of the present invention satisfy the Equations (1), (2), (3)/(3'), (4), (5)/(5'), (6), (7), (8), (9), and/or (10).

Figure 47:
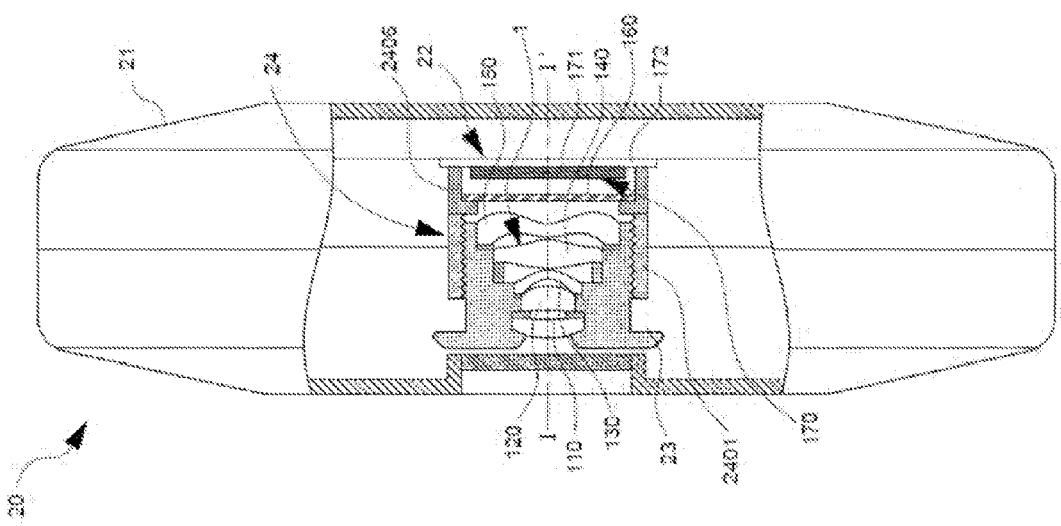
FIG. 47 is a structure of an example embodiment of a mobile device.

Reference is now made to FIG. 47, which illustrates an example structural view of a first embodiment of mobile device 20 applying an aforesaid optical imaging lens. The mobile device 20 comprises a housing 21 and a photography module 22 positioned in the housing 21. Examples of the mobile device 20 may be, but are not limited to, a mobile phone, a camera, a tablet computer, a personal digital assistant (PDA), etc.

As shown in FIG. 47, the photography module 22 may comprise an aforesaid optical imaging lens with five lens elements, which is a prime lens and for example the optical imaging lens 1 of the first embodiment, a lens barrel 23 for positioning the optical imaging lens 1, a module housing unit 24 for positioning the lens barrel 23, a substrate 172 for positioning the module housing unit 24, and an image sensor 171 which is positioned at an image side of the optical imaging lens 1. The image plane 170 is formed on the image sensor 171.

In some other example embodiments, the structure of the filtering unit 160 may be omitted. In some example embodiments, the housing 21, the lens barrel 23, and/or the module housing unit 24 may be integrated into a single component or assembled by multiple components. In some example embodiments, the image sensor 171 used in the present embodiment is directly attached to a substrate 172 in the form of a chip on board (COB) package, and such package is different from traditional chip scale packages (CSP) since COB package does not require a cover glass before the image sensor 171 in the optical imaging lens 1. Aforesaid exemplary embodiments are not limited to this package type and could be selectively incorporated in other described embodiments.

The five lens elements 110, 120, 130, 140, 150 are positioned in the lens barrel 23 in the way of separated by an air gap between any two adjacent lens elements.

The module housing unit 24 comprises a lens backseat 2401 for positioning the lens barrel 23 and an image sensor base 2406 positioned between the lens backseat 2401 and the image sensor 171. The lens barrel 23 and the lens backseat 2401 are positioned along a same axis I-I', and the lens backseat 2401 is close to the outside of the lens barrel 23. The image sensor base 2406 is exemplarily close to the lens backseat 2401 here. The image sensor base 2406 could be optionally omitted in some other embodiments of the present invention.

Because the length of the optical imaging lens 1 is merely 3.95 mm, the size of the mobile device 20 may be quite small. Therefore, the embodiments described herein meet the market demand for smaller sized product designs.

Figure 48:
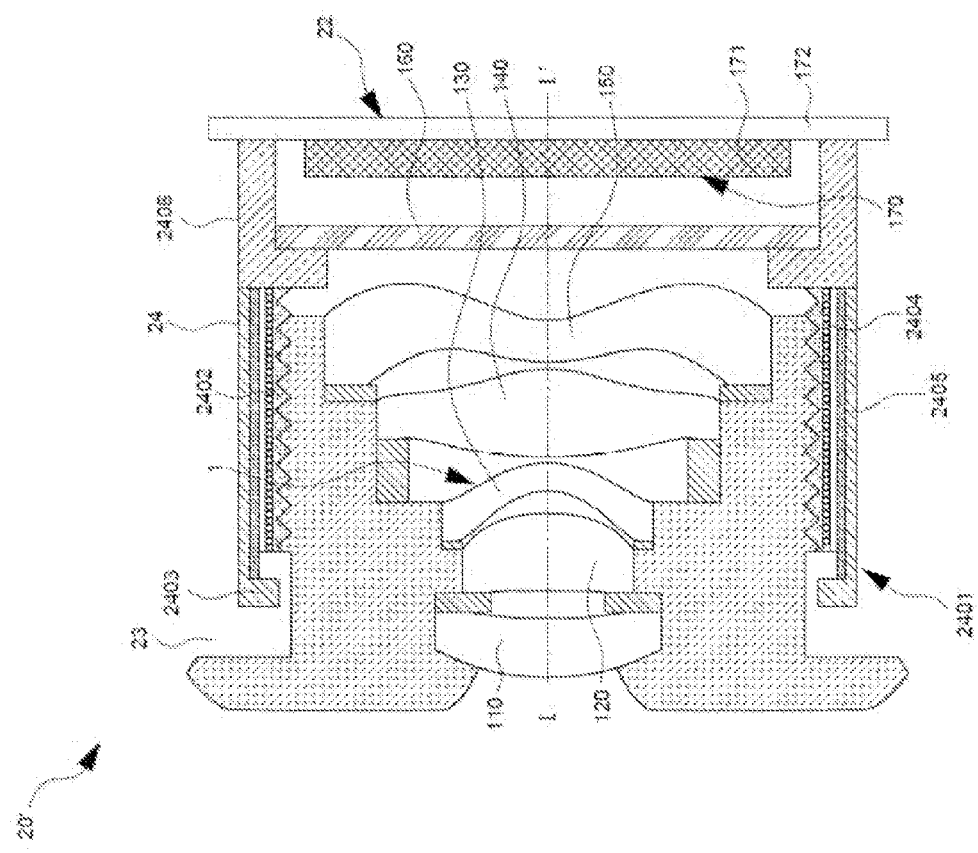
FIG. 48 is a partially enlarged view of the structure of another example embodiment of a mobile device.

Reference is now made to FIG. 48, which shows another structural view of a second embodiment of mobile device 20' applying the aforesaid optical imaging lens 1. One difference between the mobile device 20' and the mobile device 20 may be the lens backseat 2401 comprising a first seat unit 2402, a second seat unit 2403, a coil 2404 and a magnetic unit 2405. The first seat unit 2402 is close to the outside of the lens barrel 23, and positioned along an axis I-I', and the second seat unit 2403 is around the outside of the first seat unit 2402 and positioned along with the axis I-I'. The coil 2404 is positioned between the first seat unit 2402 and the inside of the second seat unit 2403. The magnetic unit 2405 is positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' is similar to the mobile device 20.

Similarly, because the length of the optical imaging lens 1, 3.95 mm, is shortened, the mobile device 20' may be designed with a smaller size and meanwhile good optical performance is still provided. Therefore, the present embodiment meets the demand of small sized product design and the request of the market.

According to above illustration, it is clear that the mobile device and the optical imaging lens thereof in example embodiments, through controlling the detail structure and/or reflection power of the lens elements, the length of the optical imaging lens is effectively shortened and meanwhile good optical characters are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, fourth and fifth lens elements, each of said first, second, third, fourth and fifth lens elements having refracting power, an object-side surface facing toward the object side and an image-side surface facing toward the image side, wherein:
said second lens element has positive refracting power, and said image-side surface thereof comprises a convex portion in a vicinity of a periphery of the second lens element;
said image-side surface of said third lens element comprises a convex portion in a vicinity of the optical axis;
said object-side surface of said fourth lens element comprises a concave portion in a vicinity of a periphery of the fourth lens element, and said image-side surface of said fourth lens element is a convex surface;
said fifth lens element is constructed by plastic material, and the optical imaging lens as a whole comprises only the five lens elements having refracting power; and
a central thickness of the fourth lens element along the optical axis is T4, an air gap between the second lens element and the third lens element along the optical axis is G23, and T4 and G23 satisfy the equation:

$$1.7 \leq T4/G23.$$

2. The optical imaging lens according to claim 1, wherein said image-side surface of said first lens element comprises a concave portion in a vicinity of the optical axis, wherein said fifth lens element has negative refracting power, and wherein a central thickness of the third lens element along the optical axis is T3, an air gap between the first lens element and the second lens element along the optical axis is G12, and T3 and G12 satisfy the equation:

$$T3/G12 \leq 3.5.$$

3. The optical imaging lens according to claim 2, wherein a central thickness of the second lens element along the optical axis is T2, an effective focal length of the optical imaging lens is EFL, and T2 and EFL satisfy the equation:

$$EFL/T2 \leq 7.5.$$

4. The optical imaging lens according to claim 3, wherein a central thickness of the first lens element along the optical axis is T1, a back focal length of the optical imaging lens, i.e. the distance from the image-side surface of the fifth lens element to an image plane on the optical axis, is BFL, and T1 and BFL satisfy the equation:

$BFL/T1 \leq 3.7$.

5. The optical imaging lens according to claim 4, wherein G12 and EFL satisfy the equation:

$EFL/G12 \leq 13$.

6. The optical imaging lens according to claim 1, wherein said image-side surface of said first lens element comprises a concave portion in a vicinity of the optical axis, wherein said fifth lens element has negative refracting power, and wherein a central thickness of the second lens element along the optical axis is T2, an effective focal length of the optical imaging lens is EFL, and T2 and EFL satisfy the equation:

$EFL/T2 \leq 7.5$.

7. The optical imaging lens according to claim 6, wherein a central thickness of the first lens element along the optical axis is T1, and T1 and EFL satisfy the equation:

$EFL/T1 \leq 7.5$.

8. The optical imaging lens according to claim 7, wherein an air gap between the first lens element and the second lens element along the optical axis is G12, a back focal length of the optical imaging lens, i.e. the distance from the image-side surface of the fifth lens element to an image plane on the optical axis, is BFL, and G12 and BFL satisfy the equation:

$BFL/G12 \leq 5.5$.

9. The optical imaging lens according to claim 1, wherein said image-side surface of said first lens element comprises a concave portion in a vicinity of the optical axis, an air gap between the first lens element and the second lens element along the optical axis is G12, an effective focal length of the optical imaging lens is EFL, and G12 and EFL satisfy the equation:

$EFL/G12 \leq 16.5$.

10. The optical imaging lens according to claim 9, wherein a back focal length of the optical imaging lens, i.e. the distance from the image-side surface of the fifth lens element to an image plane on the optical axis, is BFL, and T4 and BFL satisfy the equation:

$BFL/T4 \leq 3.2$.

11. The optical imaging lens according to claim 10, wherein the abbe number of the second lens element is V2, and the abbe number of the third lens element is V3, and V2 and V3 satisfy the equation:

$15 \leq |V2-V3| \leq 40$.

12. The optical imaging lens according to claim 1, wherein said image-side surface of said first lens element comprises a concave portion in a vicinity of the optical axis, an effective focal length of the optical imaging lens is EFL, and T4 and EFL satisfy the equation:

$EFL/T4 \leq 7$.

13. The optical imaging lens according to claim 12, wherein said fourth lens element has positive refracting power and said object-side surface of said fifth lens element further comprises a concave portion in a vicinity of a periphery of the fifth lens element.

14. The optical imaging lens according to claim 1, wherein said image-side surface of said first lens element comprises a concave portion in a vicinity of the optical axis, an air gap between the first lens element and the second lens element along the optical axis is G12, a back focal length of the optical imaging lens, i.e. the distance from the image-side surface of the fifth lens element to an image plane on the optical axis, is BFL, and G12 and BFL satisfy the equation:

$BFL/G12 \leq 7$.

15. The optical imaging lens according to claim 14, wherein said object-side surface of said fourth lens element further comprises a convex portion in a vicinity of the optical axis.

16. The optical imaging lens according to claim 15, wherein said fourth lens element has positive refracting power and said image-side surface of said fifth lens element further comprises a convex portion in a vicinity of a periphery of the fifth lens element.

17. A mobile device, comprising:
a housing; and
a photography module positioned in the housing and comprising:
an optical imaging lens sequentially from an object side to an image side along an optical axis, comprising first, second, third, fourth and fifth lens elements, each of said first, second, third, fourth and fifth lens elements having refracting power, an object-side surface facing toward the object side and an image-side surface facing toward the image side, wherein:
said second lens element has positive refracting power, and said image-side surface thereof comprises a convex portion in a vicinity of a periphery of the second lens element;
said image-side surface of said third lens element comprises a convex portion in a vicinity of the optical axis;
said object-side surface of said fourth lens element comprises a concave portion in a vicinity of a periphery of the fourth lens element, and said image-side surface of said fourth lens element is a convex surface;
said fifth lens element is constructed by plastic material, and the optical imaging lens as a whole comprises only the five lens elements having refracting power; and
a central thickness of the fourth lens element along the optical axis is T4, an air gap between the second lens element and the third lens element along the optical axis is G23, and T4 and G23 satisfy the equation:

$1.7 \leq T4/G23$;

a lens barrel for positioning the optical imaging lens;
a module housing unit for positioning the lens barrel; and
an image sensor positioned at the image side of the optical imaging lens.

* * * * *